US012762040B2

(12) United States Patent
Jain et al.

(10) Patent No.: US 12,762,040 B2
(45) Date of Patent: Oct. 13, 2026

(54) DYNAMIC INPUT-SENSITIVE VALIDATION OF MACHINE LEARNING MODEL OUTPUTS AND METHODS AND SYSTEMS OF THE SAME

(71) Applicant: Citibank, N.A., New York, NY (US)

(72) Inventors: Payal Jain, London (GB); Tariq Husayn Maonah, London (GB); Mariusz Saternus, Cracow (PL); Daniel Lewandowski, Cracow (PL); Biraj Krushna Rath, London (GB); Stuart Murray, London (GB); Philip Davies, London (GB)

(73) Assignee: CITIBANK. N.A., New York, NY (US)

(*) Notice: Subject to any disclaimer, the term of this patent is extended or adjusted under 35 U.S.C. 154(b) by 96 days.

(21) Appl. No.: 18/907,414

(22) Filed: Oct. 4, 2024

(65) Prior Publication Data

US 2025/0321857 A1 Oct. 16, 2025

Related U.S. Application Data

(63) Continuation of application No. 18/661,532, filed on May 10, 2024, now Pat. No. 12,111,747, which is a (Continued)

(51) Int. Cl.
*G06F 11/3604* (2025.01)
*G06F 8/41* (2018.01)

(52) U.S. Cl.
CPC ............ *G06F 11/3608* (2013.01); *G06F 8/41* (2013.01)

(58) Field of Classification Search
CPC ............................... G06F 11/3608; G06F 8/41
See application file for complete search history.

(56) References Cited

U.S. PATENT DOCUMENTS 9,842,045 B2 12/2017 Heorhiadi et al.
10,764,150 B1 9/2020 Hermoni et al.
(Continued)

FOREIGN PATENT DOCUMENTS

WO 2022125803 A1 6/2022
WO WO-2024020416 A1 * 1/2024 ....... G06F 16/90332

OTHER PUBLICATIONS

Empower Your Team with a Compliance Co-Pilot, Sedric, retrieved on Sep. 25, 2024. https://www.sedric.ai/.
(Continued)

*Primary Examiner* — Yonas A Bayou
(74) *Attorney, Agent, or Firm* — Ashurst Perkins Coie US LLP

(57) ABSTRACT

The systems and methods disclosed herein enable evaluation of machine learning model outputs within a virtual environment. The disclosed model validation platform enables testing of code generated for detection of malicious or anomalous outputs. For example, the model validation platform can construct a virtual machine isolated from the system and test model-generated code for validation of LLM-generated outputs. In some implementations, the model validation platform determines parameters of the virtual machine and/or associated validation test based on an evaluation of the machine learning model's output and/or the associated underlying prompt. For example, the parameters of the validation test depend on an evaluation of the user or the provided input (e.g., depending on the presence of sensitive data within the prompt). By doing so, the system enables dynamic evaluation of machine learning model outputs to improve the security and robustness of associated generated code.

20 Claims, 15 Drawing Sheets

Related U.S. Application Data continuation-in-part of application No. 18/661,519, filed on May 10, 2024, now Pat. No. 12,106,205, and a continuation-in-part of application No. 18/633,293, filed on Apr. 11, 2024, now Pat. No. 12,147,513.

(56) References Cited

U.S. PATENT DOCUMENTS

| | | | | |
|---|---|---|---|---|
| 10,951,485 | B1 | 3/2021 | Hermoni et al. | |
| 11,153,177 | B1 | 10/2021 | Hermoni et al. | |
| 11,271,822 | B1 | 3/2022 | Hermoni et al. | |
| 11,573,848 | B2 | 2/2023 | Linck et al. | |
| 11,656,852 | B2 | 5/2023 | Mazurskiy | |
| 11,750,717 | B2 | 9/2023 | Walsh et al. | |
| 11,875,123 | B1 | 1/2024 | Ben David et al. | |
| 11,875,130 | B1 * | 1/2024 | Bosnjakovic | G06F 40/35 |
| 11,924,027 | B1 * | 3/2024 | Mysore | G06F 9/5005 |
| 11,947,435 | B2 | 4/2024 | Boulineau et al. | |
| 11,960,515 | B1 * | 4/2024 | Pallakonda | G06F 16/3329 |
| 11,983,806 | B1 | 5/2024 | Ramesh et al. | |
| 11,990,139 | B1 | 5/2024 | Sandrew | |
| 11,995,412 | B1 * | 5/2024 | Mishra | G06F 16/735 |
| 12,001,463 | B1 * | 6/2024 | Pallakonda | G06F 16/3329 |
| 12,026,599 | B1 * | 7/2024 | Lewis, II | G06F 9/451 |
| 12,236,193 | B1 | 2/2025 | Kuperman et al. | |
| 2017/0262164 | A1 * | 9/2017 | Jain | G06F 3/04847 |
| 2022/0179906 | A1 | 6/2022 | Desai et al. | |
| 2022/0188663 | A1 * | 6/2022 | Appel | G06N 3/082 |
| 2022/0311681 | A1 * | 9/2022 | Palladino | G06F 11/3428 |
| 2022/0318654 | A1 | 10/2022 | Lin et al. | |
| 2022/0366140 | A1 | 11/2022 | Saito et al. | |
| 2023/0237367 | A1 * | 7/2023 | Wang | G06N 20/00 706/2 |
| 2023/0269272 | A1 | 8/2023 | Dambrot et al. | |
| 2024/0012734 | A1 | 1/2024 | Lee et al. | |
| 2024/0020538 | A1 * | 1/2024 | Socher | G06F 16/243 |
| 2024/0095077 | A1 * | 3/2024 | Singh | G06F 9/5027 |
| 2024/0129345 | A1 | 4/2024 | Kassam et al. | |
| 2024/0202442 | A1 | 6/2024 | Saito et al. | |
| 2025/0312729 | A1 * | 10/2025 | Gandhi | B01D 53/1418 |

OTHER PUBLICATIONS

Cranium, Adopt & Accelerate AI Safely, retrieved on Nov. 7, 2024, from https://cranium.ai/.

Generative machine learning models; IPCCOM000272835D, Aug. 17, 2023. (Year: 2023).

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Hu, Q., J., et al., "Routerbench: A Benchmark for Multi-LLM Routing System," arXiv:2403.12031v2 [cs.LG] Mar. 28, 2024, 16 pages.

Peers, M., "What California Al Bill Could Mean," The Briefing, published and retrieved Aug. 30, 2024, 8 pages, https://www.theinformation.com/articles/what-california-ai-bill-could-mean.

Constantin, Viorel Marian, "Artificial Intelligence-Based Algorithm For Resource Allocation", 2022, IEEE, 8 pages (Year: 2022).

Veerendra, Battula, "Dynamic Resource Allocation in Solaris/Linux Hybrid Environments Using Real-Time Monitoring And Al-Biased Load Balancing", National Institute of Health, vol. 5, (Year: 2021), pp. 81-89.

Vengerov, David, "A Reinforcement Learning Approach to Dynamic Resource Allocation", Science Direct, vol. 20, Issue 3, (Year: 2007), 13 Pages.

* cited by examiner

900

| Performance Metric 902 | Usage Value 904 | Maximum Value 906 | Threshold Metric Value 908 |
|---|---|---|---|
| Central Processing Unit (CPU) Usage | 45% | 100% | 55% |
| Memory Usage | 12.30 GB | 50.00 GB | 37.70 GB |
| Hard Disk Space Usage | 93.2 TB | 100.0 TB | 68.0 TB |
| Number of Input Tokens | 150 | 200 | 50 |
| Cost Incurred | $5,203 | $12,000 | $6,797 |

*FIG. 9*

1300

| Hardware Configuration 1310 | | Software Configuration 1330 | | Communication Configuration 1350 | |
|---|---|---|---|---|---|
| CPU Arch. | x86 | Operating System | OpsSys A | Wireless Network Interface | 802.11 b 2.4GHz |
| GPU Arch. | SIMD | OS Version | 2.4.5 | Wireless Network Type | WPA2 |
| Storage Type | SSD | Home Path | '/home' | Wireless Network Encryption | AES |
| Storage Space | 1 TB | Display Identifier | '/disp' | Wireless Network Ports | 80 and 443 |
| Memory Space | 16 GB | Language | 'en_GB.UTF-8' | Ethernet Input | IEEE 802.3 |
| | | | | Ethernet Cable | IEEE 802.3 |
| | | | | Ethernet Connector | RJ45 |
| | | | | Ethernet Ports | 80 and 443 |

*FIG. 13*

1400

Test Output
1402

23:00: Connection C Initiated

23:01: Memory Usage: 15.3 GB / 16.00 GB

23:01: Data Packet Sent via Connection C

23:04: John Smith personal information transmitted via Connection C

23:09: Program Terminated

Expected Output
1404

23:00: Connection B Initiated

23:00: Memory Usage: 8.0 GB / 16.00 GB

23:01: Data Packet Sent via Connection B

23:02: Anonymized personal information transmitted via Connection B

23:07: Program Terminated

*FIG. 14A*

| Validation Indicator 1410 | |
|---|---|
| Anomalous Connection | Detected |
| Sensitive Information | Detected |
| Similarity Metric | 0.79 |
| Maximum Memory Usage | 15 GB / 16 GB |

*FIG. 14B*

DYNAMIC INPUT-SENSITIVE VALIDATION OF MACHINE LEARNING MODEL OUTPUTS AND METHODS AND SYSTEMS OF THE SAME

CROSS-REFERENCE TO RELATED APPLICATION(S)

This application is a continuation of U.S. patent application Ser. No. 18/661,532 entitled "DYNAMIC, RESOURCE-SENSITIVE MODEL SELECTION AND OUTPUT GENERATION AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. The content of the foregoing applications is incorporated herein by reference in their entirety.

BACKGROUND

A large language model (LLM) is a language model notable for its ability to achieve general-purpose language generation and other natural language processing tasks such as classification. LLMs acquire these abilities by learning statistical relationships from text documents during a computationally intensive self-supervised and semi-supervised training process. LLMs can be used for text generation, a form of generative AI, by taking an input text and repeatedly predicting the next token or word.

Generative machine learning models, such as LLMs, are increasing in use and applicability over time. However, LLMs can be associated with security breaches or other undesirable outcomes. For example, LLMs can be susceptible to the divulgence of training data through prompt engineering and manipulation. Some generative machine learning models can be associated with algorithmic bias (e.g., propagating skewed representations of different entities) on the basis of training data.

BRIEF DESCRIPTION OF THE DRAWINGS

FIG. 9 shows a schematic of a data structure illustrating a system state and associated threshold metric values, in accordance with some implementations of the present technology.

FIG. 13 shows a data structure depicting a virtual machine configuration, in accordance with some implementations of the present technology.

FIG. 14A shows a data structure depicting a test output and an expected output, in accordance with some implementations of the present technology.

FIG. 14B shows a data structure depicting a validation indicator, in accordance with some implementations of the present technology.

Figure 1:
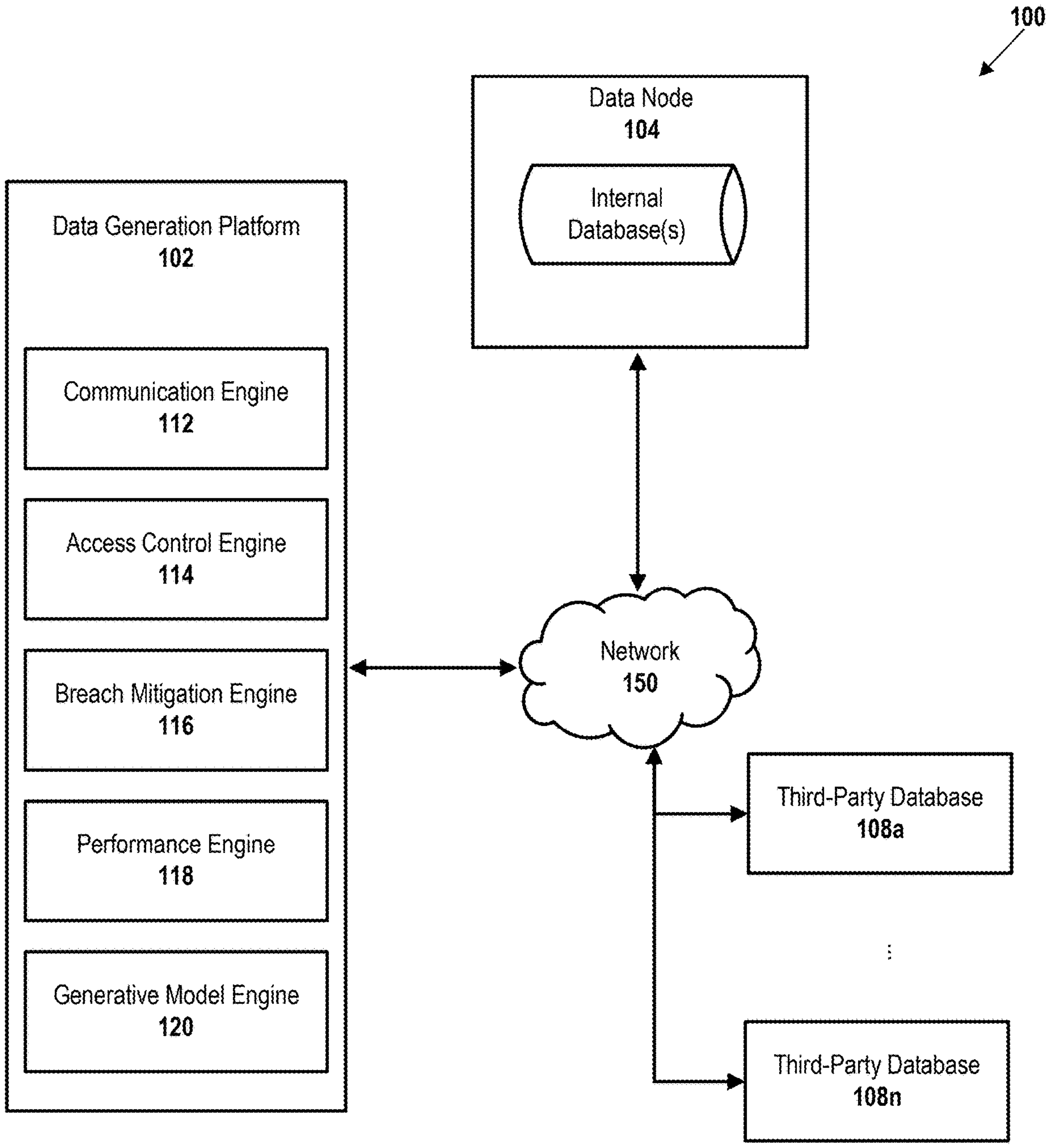
FIG. 1 shows an illustrative environment for evaluating language model prompts and outputs for model selection and validation, in accordance with some implementations of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Pre-existing LLMs and other generative machine learning models are promising for a variety of natural language processing and generation applications. In addition to generating human-readable, verbal outputs, pre-existing systems can leverage LLMs to generate technical content, including software code, architectures, or code patches based on user prompts, such as in the case of a data analysis or software development pipeline. Based on particular model architectures and training data used to generate or tune LLMs, such models can exhibit different performance characteristics, specializations, performance behaviors, and attributes.

However, users or services of pre-existing software development systems (e.g., data pipelines for data processing and model or application development) do not have intuitive, consistent, or reliable ways to select particular LLM models and/or design associated prompts in order to solve a given problem (e.g., to generate a desired code associated with a particular software application). As an illustrative example, different users of a software development system have different security requirements (e.g., relating to data available for software development), resource allocation requirements (e.g., associated with available system resources for the particular software application), and reporting requirements associated with various stages of the associated data pipeline. Such pre-existing systems can require manual selection and configuration of LLMs for output generation, which can be in similar or different types (e.g., one or more of, text, code, images, audio signals, videos, and so on). As such, pre-existing systems risk selection of sub-optimal (e.g., relatively inefficient and/or insecure) generative machine learning models. For example, a user selects a model that is not configured to respond to the desired prompt (e.g., not configured to generate code of a given type or language) or selects a model that uses significant system resources, thereby causing delays in software development or data processing, as well as system-wide disruptions for other users of the same system resources.

Furthermore, pre-existing software development systems do not control access to various system resources or models. For example, the system cannot prevent particular users from using particular LLMs (e.g., depending on the users' level of experience or another suitable classification of the user). Even in cases where a user is authorized to use a given LLM for natural language generation, the user's prompts, as provided to the LLM, can be suboptimal or associated with security breaches. For example, a user can attempt to submit sensitive or forbidden data through the prompt (e.g., personal identifiable information (PII) of a secure data storage system), thereby potentially exposing sensitive information to the LLM or associated third-party entities. As another example, a user can attempt to submit data that should not be considered when determining an outcome, such as submitting demographic/racial data when determining eligibility for a loan application.

Moreover, pre-existing development pipelines do not validate outputs of the LLMs for security breaches in a context-dependent, and flexible manner. For example, in some cases, an output from an LLM includes compilable code samples and/or representations of executable programs, which can threaten the stability or security of a given system. Code generated through an LLM can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks. As such, pre-existing software development pipelines can require manual application of rules or policies for output validation depending on the precise nature of generated output, thereby leading to inefficiencies in data processing and application development.

The data generation platform disclosed herein enables dynamic evaluation of machine learning prompts for model selection, as well as validation of the resulting outputs, in order to improve the security, reliability, and modularity of data pipelines (e.g., software development systems). The data generation platform can receive a prompt from a user (e.g., a human-readable request relating to software development, such as code generation) and determine whether the user is authenticated based on an associated authentication token (e.g., as provided concurrently with the prompt). In some implementations, the user provides an indication of a desired model (e.g., an LLM) to be used to generate the resulting output, such as through the specification of a natural language generation (NLG) engine or architecture. Additionally or alternatively, the platform can suggest a particular model based on the nature of the prompt the user, and/or the desired output. Based on the selected model, the data generation platform can determine a set of performance metrics (and/or corresponding values) associated with processing the requested prompt via the selected model. By doing so, the data generation platform can evaluate the suitability of the selected model (e.g., LLM) for generating an output based on the received input or prompt (e.g., by considering the required system resource usage, expect time to generate the output, networking/computing power required, number/types of additional systems with which interaction is required, and so on).

The data generation platform can validate and/or modify the user's prompt according to a prompt validation model. For example, the data generation platform determines a set of prompt validation models that are relevant to the given prompt (e.g., based on detection of particular attributes or features within the prompt). By doing so, the data generation platform enables modular, flexible, and configurable prompt evaluation in an automated manner. Based on the results of the prompt validation model, the data generation platform can modify the prompt such that the prompt satisfies any associated validation criteria (e.g., through the redaction of sensitive data or other details) thereby mitigating the effect of potential security breaches, inaccuracies, or adversarial manipulation associated with the user's prompt.

The data generation platform can compare the performance metric value with an associated threshold or criterion. For example, the data generation platform determines that the estimated system resources required to process the prompt through the associated LLM is less than an allotment assigned to the user. As such, the data generation platform can proceed to provide the prompt to the LLM for generation of the requested output. In some implementations, the data generation platform further evaluates the output for accuracy, security, safety (e.g., with respect to associated policies, requirements, or criteria), compliance (e.g., compliance with regulations, rules, guidelines, etc.), and/or other requirements/recommendations. As an illustrative example, the data generation platform tests any generated code within a virtual machine or another suitable isolated environment to determine any security risks of the generated code. In response to validating the generated output, the data generation platform can transmit this information to an associated data store or deployment system (e.g., any relevant consumer of the generated data, such as a server that is accessible to the user).

The disclosed data generation platform enables streamlined, modular, and secure data pipelines (e.g., software development) through user authentication, prompt validation, and output evaluation. By controlling access to available models (e.g., LLMs) on a user-dependent and/or an application-dependent basis, the data generation platform enables targeted mitigation of unauthorized access, in a flexible manner. For example, the platform enables different treatment of different users according to the users' credentials, experience levels, and/or other attributes.

Moreover, the disclosed data generation platform enables evaluation of the user's prompt in a flexible, modular manner. For example, the data generation platform determines which prompt validation rules, criteria, or models with which to evaluate the user's prompt (e.g., based on the identity of the user, the nature of the prompt, and/or other suitable factors). Based on this determination, the data generation platform can evaluate the prompt with respect to relevant criteria, while avoiding the need to evaluate the prompt against unsuitable or unrelated criteria. In some implementations, the data generation platform evaluates the performance requirements associated with the prompt generate a recommendation for a suitable LLM for the received prompt (e.g., to improve the efficiency of system resource use). In some implementations, the data generation platform enables evaluation of model outputs in a flexible, modular manner (e.g., depending on the type of output). By doing so, the system can mitigate inaccuracies, security breaches, or other issues in data generated through LLMs in a user-dependent, application-dependent, and/or output-dependent manner. As such, the data generation platform enables targeted, configurable, modular, and flexible prompt and output evaluation.

By handling the receipt, evaluation, and processing of the user's prompt, as well as the associated output, the data generation platform can enable dynamic communication with suitable entities regarding the data processing or language generation process. For example, the data generation platform integrates with other associated systems (e.g., authentication systems, performance evaluation systems, or data storage systems) by generating and transmitting logs, reports, or other such information to suitable systems throughout the prompt evaluation and output generation process. By doing so, the data generation platform can enable dynamic evaluation and control of the pipeline (e.g., software development), thereby improving the efficacy of administrator troubleshooting and monitoring operations.

The inventors have also developed a system for dynamically selecting models for processing user prompts in a resource-sensitive manner. For example, the data generation platform can determine one or more performance metrics that can be impacted by processing an input (e.g., a prompt) using an associated model (e.g., an LLM). The performance metrics can include CPU usage (e.g., associated with a percentage of processing power required to generate an output) or cost (e.g., associated with a financial or monetary cost for generating the output using the associated LLM). Accordingly, the data generation platform can determine a system state that indicates the value of the performance metric (e.g., at the time of the output generation request). The system state can include a current CPU usage associated with processors of the data generation platform. Based on the system state, the data generation platform can calculate a threshold metric value that indicates an allotment of system resources available for generating an output based on the prompt. For example, the data generation platform can determine a remaining allowance of CPU usage that may be used in generating the output using the LLM by determining the remaining available CPU processing power based on the system state.

The data generation platform can determine the estimated performance metric value associated with generating the output using the user's selected machine learning model (e.g., LLM). For example, the data generation platform can estimate a CPU usage value (e.g., as a percentage of total CPU processing power) for generating the output using the selected LLM. The data generation platform can determine whether this value is consistent with the system state. To illustrate, the data generation platform can determine whether the estimated performance metric value satisfies the threshold metric value (e.g., whether the estimated CPU usage value is less than or equal to the remaining allowance of CPU usage). In some implementations, the data generation platform evaluates multiple performance metrics to determine whether the performance metric value satisfies the threshold metric value. By doing so, the data generation platform can mitigate system-related issues relating to generating the requested output using the selected LLM.

In response to determining that the estimated performance metric value satisfies the threshold metric value, the data generation platform can provide the prompt to the selected model (e.g., LLM) for generation of the requested output and subsequent transmission to a system that enables the user to view the output. When the estimated performance metric value does not satisfy the threshold metric value, the data generation platform can determine another model (e.g., a second LLM) for generation of the output. The data generation platform can determine estimated performance metric values associated with generating the output using a set of other LLMs and determine a subset of the estimated metric values that satisfy the threshold metric value. For example, the data generation platform determines estimated costs associated with generating outputs using other LLMs associated with the platform. The data generation platform can compare an estimated cost (e.g., a second estimated performance metric value) of a second LLM with the remaining allowance associated with the threshold metric value. When the data generation platform determines that the second estimated performance metric value is consistent with the threshold metric value, the platform can generate the output using the second LLM and transmit the output to a computing system that enables access to the user.

As such, the disclosed data generation platform enables flexible, secure, and modular control over the use of LLMs to generate outputs. By evaluating the system effects associated with processing an input (e.g., a natural language prompt) using an LLM to generate an output, the data generation platform can mitigate adverse effects associated with system overuse (e.g., CPU overclocking or cost overruns). Furthermore, by redirecting the prompt to an appropriate model (e.g., such that the predicted system resource use is within expected or allowed bounds), the data generation platform enables the generation of outputs in a resilient, flexible manner, such that inputs are dynamically evaluated in light of changing system conditions (e.g., changing values of CPU usage, bandwidth, or incurred cost). As such, the disclosed data generation platform can be resilient against the varying availability of system resources, thereby improving the efficiency and functionality of the data generation platform while preventing the overuse of system resources.

The inventors have also developed a system for evaluating model outputs in an isolated environment to mitigate errors and security breaches. For example, the data generation platform determines whether an output from a machine learning model, such as an LLM, includes particular types of data (e.g., including software-related information, such as a code sample, code snippet, or an executable program). In such cases, the data generation platform can provide the generated output to a parameter generation model (e.g., an LLM) configured to generate validation test parameters to validate the nature of the output data (e.g., the generated code). For example, using the parameter generation model, the platform generates compilation instructions for an appropriate programming language, where the compilation instructions identify or locate a compiler for compiling a set of executable instructions based on the generated code.

The parameter generation model can generate a virtual machine configuration for testing the behavior of the executable instructions. For example, the data generation platform determines an indication of a simulated hardware configuration for a virtual environment in which to test and host the compiled instructions, including a processor architecture and/or memory/storage limits associated with the virtual environment. In some implementations, the data generation platform determines a software configuration for the virtual environment, including an operating system and/or associated environment variables (e.g., directory structures and/or relevant filepaths). Additionally or alternatively, the data generation platform generates a communication configuration (e.g., using the parameter generation model) that indicates simulated communication or network links with the virtual environment (e.g., wireless access network (WAN), local area network (LAN), or peripheral connections).

In some implementations, the parameter generation model generates validation criteria associated with testing the generated code. For example, the parameter generation model generates a set of rules relating to desired behavior of the code, such as an indication of whether execution of the compiled code leads to security breaches (e.g., communication anomalies) and/or security breaches (e.g., the exposure of sensitive/personal information). Additionally or alternatively, the parameter generation model generates an indication of an expected output (e.g., an ideal log file indicating desired actions executed by the program). By generating validation criteria, the parameter generation model configures and customizes test parameters according to the nature of the input and/or associated factors, thereby enabling the testing of generated code in a modular, application-specific manner.

The data generation platform can generate the virtual environment (e.g., within a virtual machine) according to the virtual machine configuration to enable compilation of the generated code within an isolated environment (e.g., a "sandcastle") for testing the code. In response to executing the compiled code (e.g., generated executable instructions), the data generation platform can evaluate a test output within the isolated environment for detection of anomalies or unexpected behavior. Based on validating the test output, the platform can determine whether to transmit the machine learning model's output (e.g., the code sample) to the user and/or to regenerate the code to address any anomalies or security breaches.

The disclosed data generation platform enables the flexible evaluation of output in an application-specific manner. To illustrate, the data generation platform can configure a validation test for evaluating code generated from an LLM based on information within the prompt provided to the LLM and the nature of the output of the LLM. For example, the data generation platform can set different evaluation standards depending on whether the prompt and/or LLM output includes sensitive information and/or based on user credentials associated with the user associated with the output generation request. As such, the data generation platform enables modular, flexible evaluation of machine learning model outputs.

Furthermore, the data generation platform can configure the test environment (e.g., a virtual machine environment) depending on the applicability of the generated code or nature of the input and/or user. For example, the data generation platform can test the code in a suitable hardware or software environment based on a determination of the type of device suitable for executing the generated code. As such, the data generation platform enables dynamic, flexible testing of a variety of types of generated output from large language models or other generative machine learning models.

By monitoring test outputs from compiled code generated by a machine learning model (e.g., an LLM), the data generation platform enables mitigation of errors, software bugs, or other unintended system effects. To illustrate, the data generation platform enables monitoring of system behavior associated with the isolated testing environment (e.g., a virtual machine) to detect any possible security or privacy breaches associated with the execution of the generated code prior to deployment, thereby mitigating any unintended consequences associated with the generated code. Furthermore, by monitoring communications attempted to and from the isolated virtual machine environment, the data generation platform enables detection of malicious behavior (e.g., attempts to transmit sensitive information out of the virtual machine environment), thereby mitigating security breaches.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed data generation platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Data Generation Platform

FIG. 1 shows an illustrative environment 100 for evaluating machine learning model inputs (e.g., language model prompts) and outputs for model selection and validation, in accordance with some implementations of the present technology. For example, the environment 100 includes the data generation platform 102, which is capable of communicating with (e.g., transmitting or receiving data to or from) a data node 104 and/or third-party databases 108*a*-108*n* via a network 150. The data generation platform 102 can include software, hardware, or a combination of both and can reside on a physical server or a virtual server (e.g., as described in FIG. 3) running on a physical computer system. For example, the data generation platform 102 can be distributed across various nodes, devices, or virtual machines (e.g., as in a distributed cloud server). In some implementations, the data generation platform 102 can be configured on a user device (e.g., a laptop computer, smartphone, desktop computer, electronic tablet, or another suitable user device). Furthermore, the data generation platform 102 can reside on a server or node and/or can interface with third-party databases 108*a*-108*n* directly or indirectly.

The data node 104 can store various data, including one or more machine learning models, prompt validation models, associated training data, user data, performance metrics and corresponding values, validation criteria, and/or other suitable data. For example, the data node 104 includes one or more databases, such as an event database (e.g., a database for storage of records, logs, or other information associated with LLM-related user actions), a vector database, an authentication database (e.g., storing authentication tokens associated with users of the data generation platform 102), a secret database, a sensitive token database, and/or a deployment database.

An event database can include data associated with events relating to the data generation platform 102. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 102 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 102). By doing so, the data generation platform 102 can store and track information relating to performance, errors, and troubleshooting. The data generation platform 102 can include one or more subsystems or subcomponents. For example, the data generation platform 102 includes a communication engine 112, an access control engine 114, a breach mitigation engine 116, a performance engine 118, and/or a generative model engine 120.

A vector database can include data associated with vector embeddings of data. For example, the vector database includes a numerical representations (e.g., arrays of values) that represent the semantic meaning of unstructured data (e.g., text data, audio data, or other similar data). For example, the data generation platform 102 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 102 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 102 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the data generation platform 102 can evaluate prompts and/or outputs to prevent breaches or leakage of such sensitive information.

A deployment database can include data associated with deploying, using, or viewing results associated with the data generation platform 102. For example, the deployment database can include a server system (e.g., physical or virtual) that stores validated outputs or results from one or more LLMs, where such results can be accessed by the requesting user.

The data generation platform 102 can receive inputs (e.g., prompts), training data, validation criteria, and/or other suitable data from one or more devices, servers, or systems. The data generation platform 102 can receive such data using communication engine 112, which can include software components, hardware components, or a combination of both. For example, the communication engine 112 includes or interfaces with a network card (e.g., a wireless network card and/or a wired network card) that is associated with software to drive the card and enables communication with network 150. In some implementations, the communication engine 112 can also receive data from and/or communicate with the data node 104, or another computing device. The communication engine 112 can communicate with the access control engine 114, the breach mitigation engine 116, the performance engine 118, and the generative model engine 120.

In some implementations, the data generation platform 102 can include the access control engine 114. The access control engine 114 can perform tasks relating to user/device authentication, controls, and/or permissions. For example, the access control engine 114 receives credential information, such as authentication tokens associated with a requesting device and/or user. In some implementations, the access control engine 114 can retrieve associated stored credentials (e.g., stored authentication tokens) from an authentication database (e.g., stored within the data node 104). The access control engine 114 can include software components, hardware components, or a combination of both. For example, the access control engine 114 includes one or more hardware components (e.g., processors) that are able to execute operations for authenticating users, devices, or other entities (e.g., services) that request access to an LLM associated with the data generation platform 102. The access control engine 114 can directly or indirectly access data, systems, or nodes associated with the third-party databases **108*a*-108*n* and can transmit data to such nodes. Additionally or alternatively, the access control engine 114 can receive data from and/or send data to the communication engine 112, the breach mitigation engine 116, the performance engine 118, and/or the generative model engine 120**.

The breach mitigation engine 116 can execute tasks relating to the validation of inputs and outputs associated with the LLMs. For example, the breach mitigation engine 116 validates inputs (e.g., prompts) to prevent sensitive information leakage or malicious manipulation of LLMs, as well as validate the security or safety of the resulting outputs. The breach mitigation engine 116 can include software components (e.g., modules/virtual machines that include prompt validation models, performance criteria, and/or other suitable data or processes), hardware components, or a combination of both. As an illustrative example, the breach mitigation engine 116 monitors prompts for the inclusion of sensitive information (e.g., PII), or other forbidden text, to prevent leakage of information from the data generation platform 102 to entities associated with the target LLMs. The breach mitigation engine 116 can communicate with the communication engine 112, the access control engine 114, the performance engine 118, the generative model engine 120, and/or other components associated with the network 150 (e.g., the data node 104 and/or the third-party databases 108*a*-108*n*).

The performance engine 118 can execute tasks relating to monitoring and controlling performance of the data generation platform 102 (e.g., or the associated development pipeline). For example, the performance engine 118 includes software components (e.g., performance monitoring modules), hardware components, or a combination thereof. To illustrate, the performance engine 118 can estimate performance metric values associated with processing a given prompt with a selected LLM (e.g., an estimated cost or memory usage). By doing so, the performance engine 118 can determine whether to allow access to a given LLM by a user, based on the user's requested output and the associated estimated system effects. The performance engine 118 can communicate with the communication engine 112, the access control engine 114, the performance engine 118, the generative model engine 120, and/or other components associated with the network 150 (e.g., the data node 104 and/or the third-party databases 108*a*-108*n*).

The generative model engine 120 can execute tasks relating to machine learning inference (e.g., natural language generation based on a generative machine learning model, such as an LLM). The generative model engine 120 can include software components (e.g., one or more LLMs, and/or API calls to devices associated with such LLMs), hardware components, and/or a combination thereof. To illustrate, the generative model engine 120 can provide users' prompts to a requested, selected, or determined model (e.g., LLM) to generate a resulting output (e.g., to a user's query within the prompt). As such, the generative model engine 120 enables flexible, configurable generation of data (e.g., text, code, or other suitable information) based on user input, thereby improving the flexibility of software development or other such tasks. The generative model engine 120 can communicate with the communication engine 112, the access control engine 114, the performance engine 118, the generative model engine 120, and/or other components associated with the network 150 (e.g., the data node 104 and/or the third-party databases 108*a*-108*n*).

Engines, subsystems, or other components of the data generation platform 102 are illustrative. As such, operations, subcomponents, or other aspects of particular subsystems of the data generation platform 102 can be distributed, varied, or modified across other engines. In some implementations, particular engines can be deprecated, added, or removed. For example, operations associated with breach mitigation are performed at the performance engine 118 instead of at the breach mitigation engine 116.

Suitable Computing Environments

Figure 2:
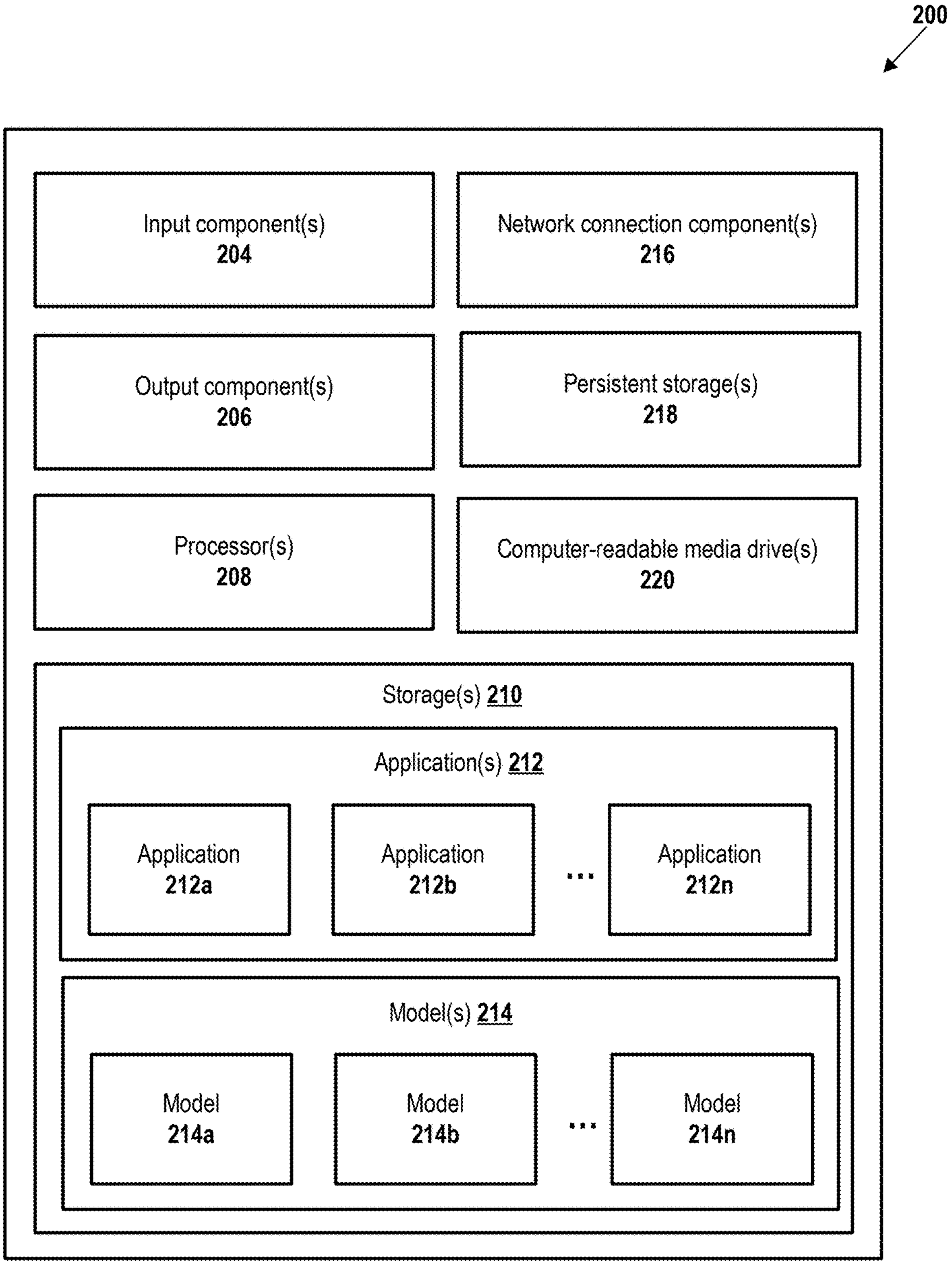
FIG. 2 shows a block diagram showing some of the components typically incorporated in at least some of the computer systems and other devices on which the disclosed system operates in accordance with some implementations of the present technology.

FIG. 2 shows a block diagram showing some of the components typically incorporated in at least some of the computer systems and other devices 200 on which the disclosed system (e.g., the data generation platform 102) operates in accordance with some implementations of the present technology. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 206, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 208, including a CPU for executing computer programs, a GPU for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 3:
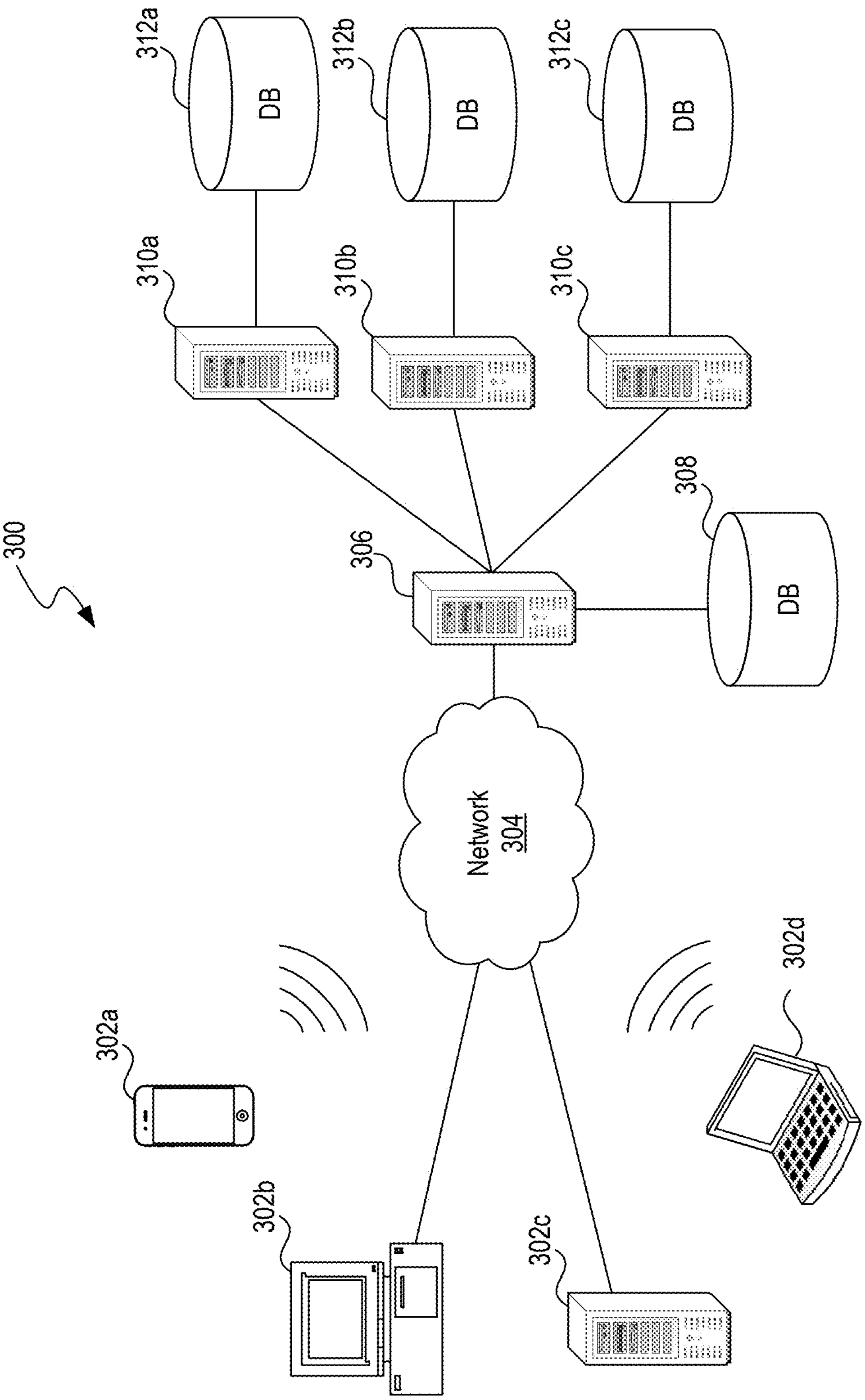
FIG. 3 is a system diagram illustrating an example of a computing environment in which the disclosed system operates in some implementations of the present technology.

FIG. 3 is a system diagram illustrating an example of a computing environment 300 in which the disclosed system operates in some implementations of the present technology. In some implementations, environment 300 includes one or more client computing devices 302*a*-302*d*, examples of which can host graphical user interfaces associated with client devices. For example, one or more of the client computing devices 302*a*-302*d* includes user devices and/or devices associated with services requesting responses to queries from LLMs. Client computing devices 302 operate in a networked environment using logical connections through network 304 (e.g., the network 150) to one or more remote computers, such as a server computing device (e.g., a server system housing the data generation platform 102 of FIG. 1). In some implementations, client computing devices 302 can correspond to device 200 (FIG. 2).

In some implementations, server computing device 306 is an edge server that receives client requests and coordinates fulfillment of those requests through other servers, such as server computing devices 310*a*-310*c*. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310*a*-310*c*) connect to a corresponding database (308, 312*a*-312*c*). For example, the corresponding database includes a database stored within the data node 104 (e.g., a sensitive token database, an event database, or another suitable database). As discussed above, each server computing device 310 can correspond to a group of servers, and each of these servers can share a database or can have its own database (and/or interface with external databases, such as third-party databases 108*a*-108*n*). In addition to information described concerning the data node 104 of FIG. 1, databases 308 and 312 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 (e.g., corresponding to the network 150) can be a local area network (LAN) or a wide area network (WAN) but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of LAN, WAN, wired network, or wireless network, including network 304 or a separate public or private network.

Data Generation Platform

Figure 4:
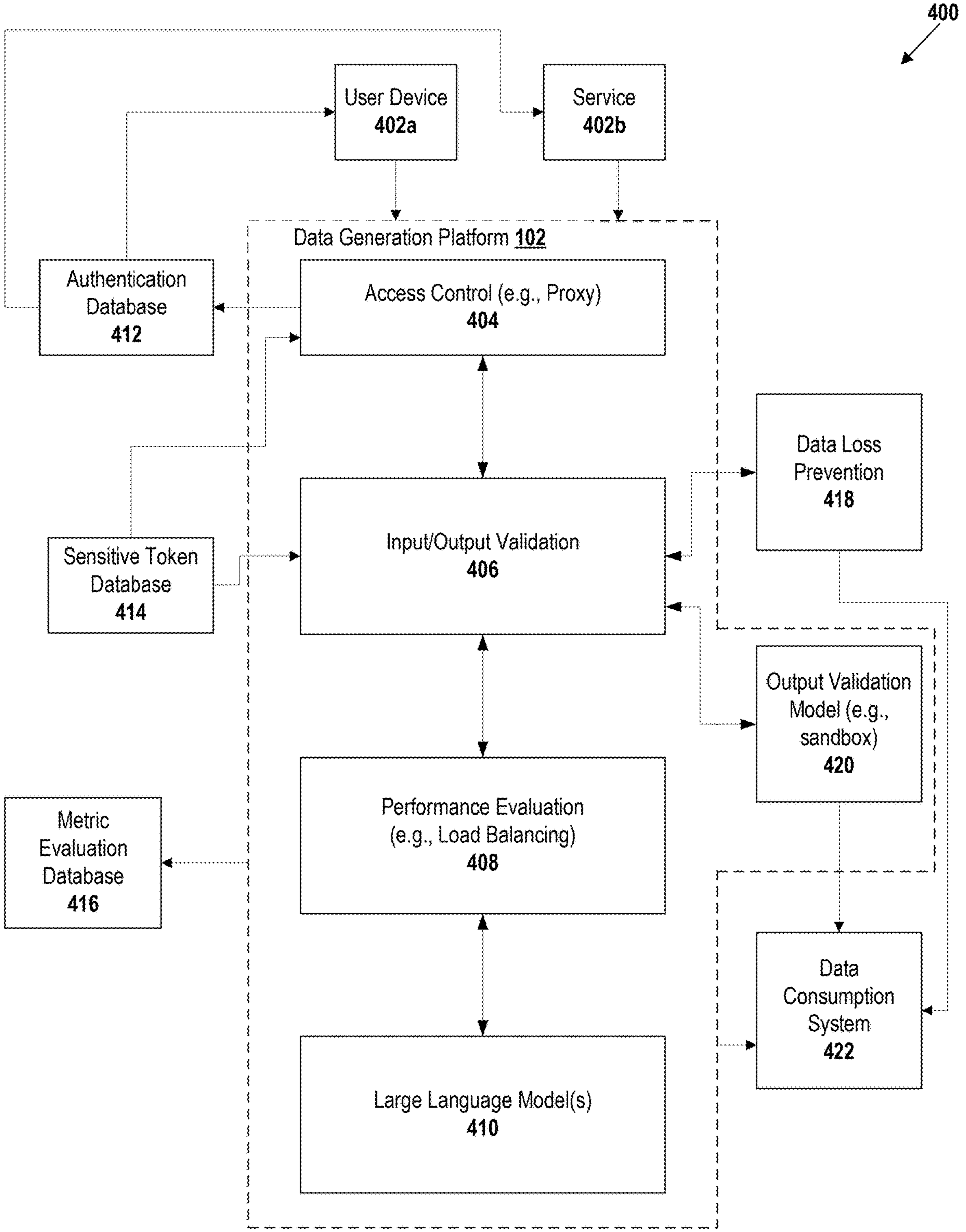
FIG. 4 is a schematic illustrating a process for validating model inputs and outputs, in accordance with some implementations of the present technology.

FIG. 4 is a schematic illustrating a process 400 for validating model inputs and outputs, in accordance with some implementations of the present technology. For example, a user device 402*a* or a service 402*b* provides an output generation request (e.g., including an input, such as a prompt, and an authentication token) to the data generation platform 102 (e.g., to the access control engine 114 for access control 404 via the communication engine 112 of FIG. 1). The access control engine 114 can authenticate the user device 402*a* or service 402*b* by identifying stored tokens within an authentication database 412 that match the provided authentication token. The access control engine 114 can communicate the prompt to the breach mitigation engine 116 for input/output validation 406. The breach mitigation engine 116 can communicate with a sensitive token database 414 and/or a data-loss prevention engine 418, and/or an output validation model 420 for validation of prompts and/or LLM outputs. Following input validation, the performance engine 118 can evaluate the performance of LLMs to route the prompt to an appropriate LLM (e.g., large language model(s) 410). The data generation platform 102 can transmit the generated output to the output validation model 420 for testing and validation of the output (e.g., to prevent security breaches). The output validation model 420 can transmit the validated output to a data consumption system 422, for exposure of the output to the user device 402*a* and/or the service 402*b*. In some implementations, the data generation platform 102 can transmit metric values, records, or events associated with the data generation platform 102 to a metric evaluation database 416 (e.g., an event database) for monitoring, tracking, and evaluation of the data generation platform 102.

A user device (e.g., the user device 402*a*) and/or a module, component, or service of a development pipeline (e.g., a service 402*b*) can generate and transmit an output generation request to the data generation platform 102 (e.g., via the communication engine 112 of FIG. 1). An output generation request can include an indication of a requested output from a machine learning model. The output generation request can include an input, such as a prompt, an authentication token, and/or a user/device identifier of the requester. To illustrate, the output generation request can include a prompt (e.g., a query) requesting data, information, or data processing (e.g., from an LLM). The prompt can include a natural language question or command (e.g., in English). For example, the prompt includes a request for an LLM to generate code (e.g., within a specified programming language) that executes a particular operation. Additionally or alternatively, a prompt includes a data processing request, such as a request to extract or process information of a database (e.g., associated with one or more of the third-party databases 108*a*-108*n*). The output generation request can be transmitted to the data generation platform 102 using an API call to an API associated with the data generation platform 102 and/or through a graphical user interface (GUI).

The output generation request can include textual and/or non-textual inputs. For example, the output generation request includes audio data (e.g., a voice recording), video data, streaming data, database information, and other suitable information for processing using a machine learning model. For example, the output generation request is a video generation request that includes an image and a textual prompt indicating a request to generate a video based on the image. As such, machine learning models of the data generation platform disclosed herein enable inputs of various formats or combinations thereof.

Figure 5:
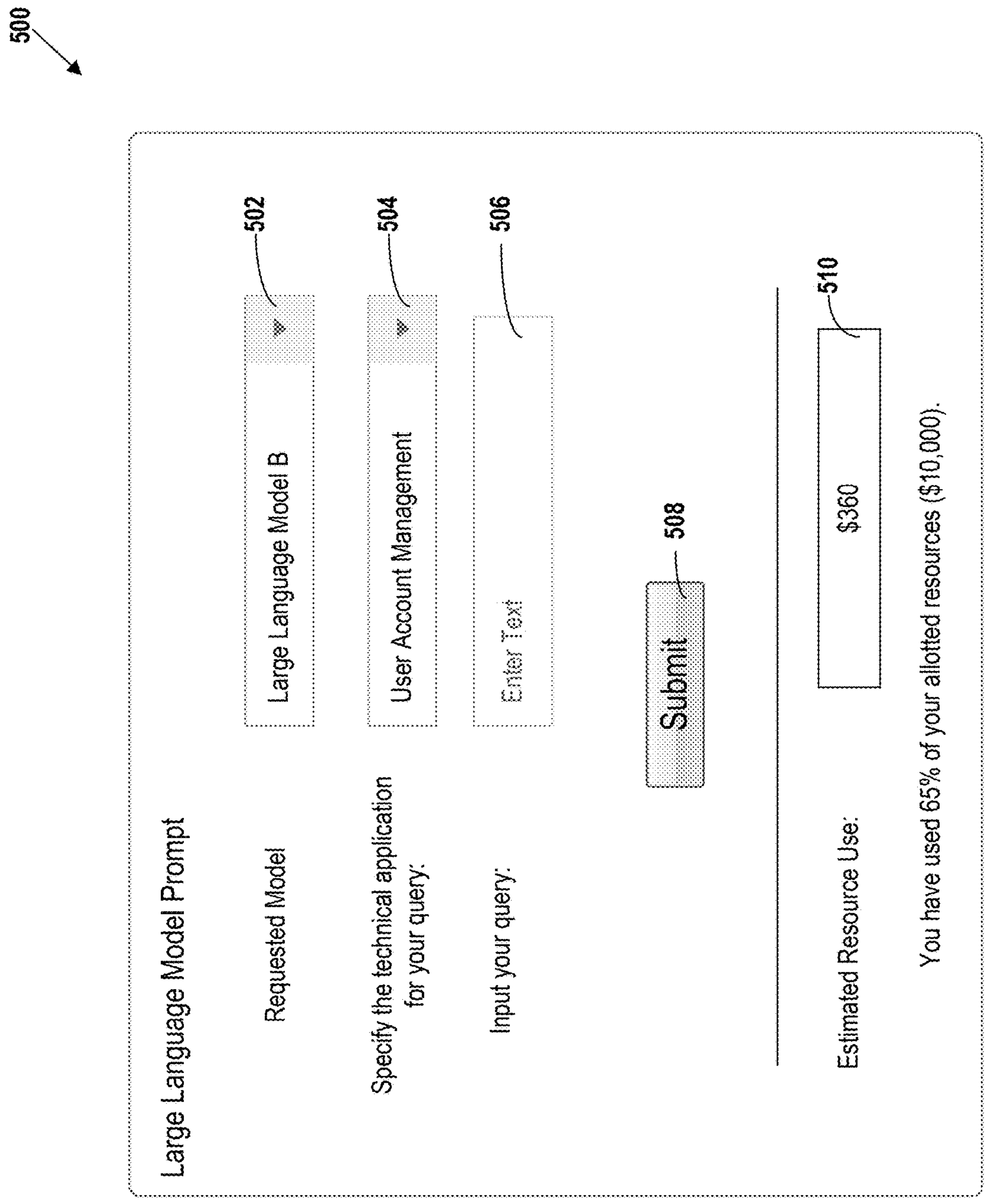
FIG. 5 shows an illustration of a graphical user interface (GUI) for accepting user prompts for LLMs associated with the response validation platform, in accordance with some implementations of the present technology.

FIG. 5 shows an illustration of a GUI 500 for accepting user prompts for LLMs associated with the response validation platform, in accordance with some implementations of the present technology. For example, the GUI 500 includes an interface whereby a user (e.g., of the data generation platform 102 or an associated development pipeline) can specify an output generation request. The user can determine and specify a requested model (e.g., as specified with the user control 502), an associated attribute for the request (e.g., a technical application for the query, as specified using the user control 504), and the associated query (e.g., using the textbox 506). The user can determine to submit the request using a user control (e.g., a button 508).

The output generation request can include or be associated with an authentication token. An authentication token can include a security token, such as user credentials (e.g., a username, a password, or a one-time password). The authentication token can be associated with a private or public key (e.g., based on an associated symmetric or asymmetric encryption algorithm). In some implementations, the authentication token includes a token generated through a multi-factor authentication device (e.g., a secondary user device associated with the user). The authentication token can be specific to or associated with a particular user (e.g., a user that is associated with a user account). Additionally or alternatively, the output generation request and associated authentication token are associated with the user device associated with the user (e.g., as associated with a corresponding MAC address). The authentication token can be linked to a particular service or module of a software development pipeline or another suitable system. For example, the authentication token is specific to a system from which an API call to the data generation platform 102 originates.

The data generation platform 102 (e.g., using the access control engine 114 of FIG. 1) can compare the provided authentication token with a matching, stored token of the authentication database 412 (e.g., through the communication engine 112). For example, the access control engine 114 determines that the provided authentication token matches an authentication token previously assigned to the associated user, user device (e.g., the user device 402*a*), and/or module (e.g., the service 402*b*). As such, the data generation platform 102 can authenticate the identity of the user requesting access to an LLM of the data generation platform 102, thereby reducing the likelihood of unauthorized access to the data generation platform 102 by malicious entities. Furthermore, by verifying the identity of the originator for the output generation request, the data generation platform 102 can evaluate the request and determine any relevant prompt validation criteria and/or LLM selection recommendations.

The output generation request can include a selected/requested model (e.g., an indication of an LLM). The indication of the model can include a selection of a type of model (e.g., specification of an architecture, type, or version of a given LLM). For example, the indication of an LLM includes an indication of an entity, address, or source of the LLM (e.g., via specification of an associated API for the LLM). As such, the user device 402*a* or the service 402*b* can specify a preferred or recommended LLM for processing the query/prompt, thereby conferring control and flexibility of software development or data processing to the user.

The output generation request can be associated with an attribute. An attribute of the request can include a characteristic, classification, application (e.g., use case), or another suitable characterization of the output generation request. For example, the output generation request enables the user to specify the technical application associated with the query (e.g., through the user control 504 of the GUI 500 of FIG. 5). In some implementations, the attribute of the request can include a team associated with the user or user device 402*a*, such as a grouping or classification of the user or user device. The attribute can include an experience level for the user. Additionally or alternatively, the data generation platform 102 (e.g., through the access control engine 114) can determine an attribute associated with the output generation request by analyzing the prompt to determine a prompt classification. For example, the access control engine 114 can determine that the prompt includes a request for generation of code and classify the output generation request as being associated with an attribute corresponding to software development. By specifying the attribute associated with the prompt, the data generation platform 102 can tailor the validation process of the prompt and any generated outputs from the associated LLMs based on the classification of the request, thereby conferring modularity and flexibility to the data generation platform 102.

The access control engine 114 can determine if the authenticated user is allowed to access the data generation platform 102 and/or associated LLMs. For example, the access control engine 114 determines a user identifier associated with the user device 402*a*. Based on the user identifier, the data generation platform 102 can determine whether the user is allowed to access one or more components of the data generation platform 102 (e.g., by matching the user identifier with an associated stored identifier of the authentication database 412). For example, the authentication database 412 specifies a list of users that are allowed to use particular LLMs of the large language model(s) 410. As such, the access control engine 114 can determine whether the user associated with the output generation request is included within such a "whitelist." Additionally or alternatively, the access control engine 114 can determine that the user is on a "blacklist" (e.g., is associated with a set of user identifiers that are not permitted to use a particular/requested LLM). As such the access control engine 114 enables flexible control over access to LLMs of the data generation platform 102, thereby improving security and flexibility of the associated development pipeline.

The access control engine 114 can determine a bandwidth and/or other limitations associated with the output generation request based on the identity (e.g., a user identifier) of the originator of the output generation request and/or based on an attribute of the output generation request. For example, the access control engine 114 determines to throttle the bandwidth associated with receiving outputs from the LLMs (e.g., by specifying a number of responses per unit time that are allowed to be transmitted to the given user). As such, the access control engine 114 can control the system-wide performance by limiting the assignment of system resources to particular users. In some implementations, the data generation platform 102 can execute a performance evaluation 408 (e.g., as discussed below) associated with the output generation request prior to subsequent prompt validation, in order to determine whether to determine the bandwidth or other suitable limitations. Additionally or alternatively, the data generation platform 102 can execute the performance evaluation 408 subsequent to prompt validation. For example, the access control engine 114 modifies or changes the LLM for execution of the prompt associated with the output generation request based on the user identifier, the attribute, and/or the performance evaluation 408.

In response to authenticating the user or service associated with the output generation request, the data generation platform 102 can, through the breach mitigation engine 116, carry out input/output validation 406. Input/output validation 406 can include validation of the prompts to be provided to one or more LLMs and/or validation of the associated outputs from the LLMs.

Figure 6:
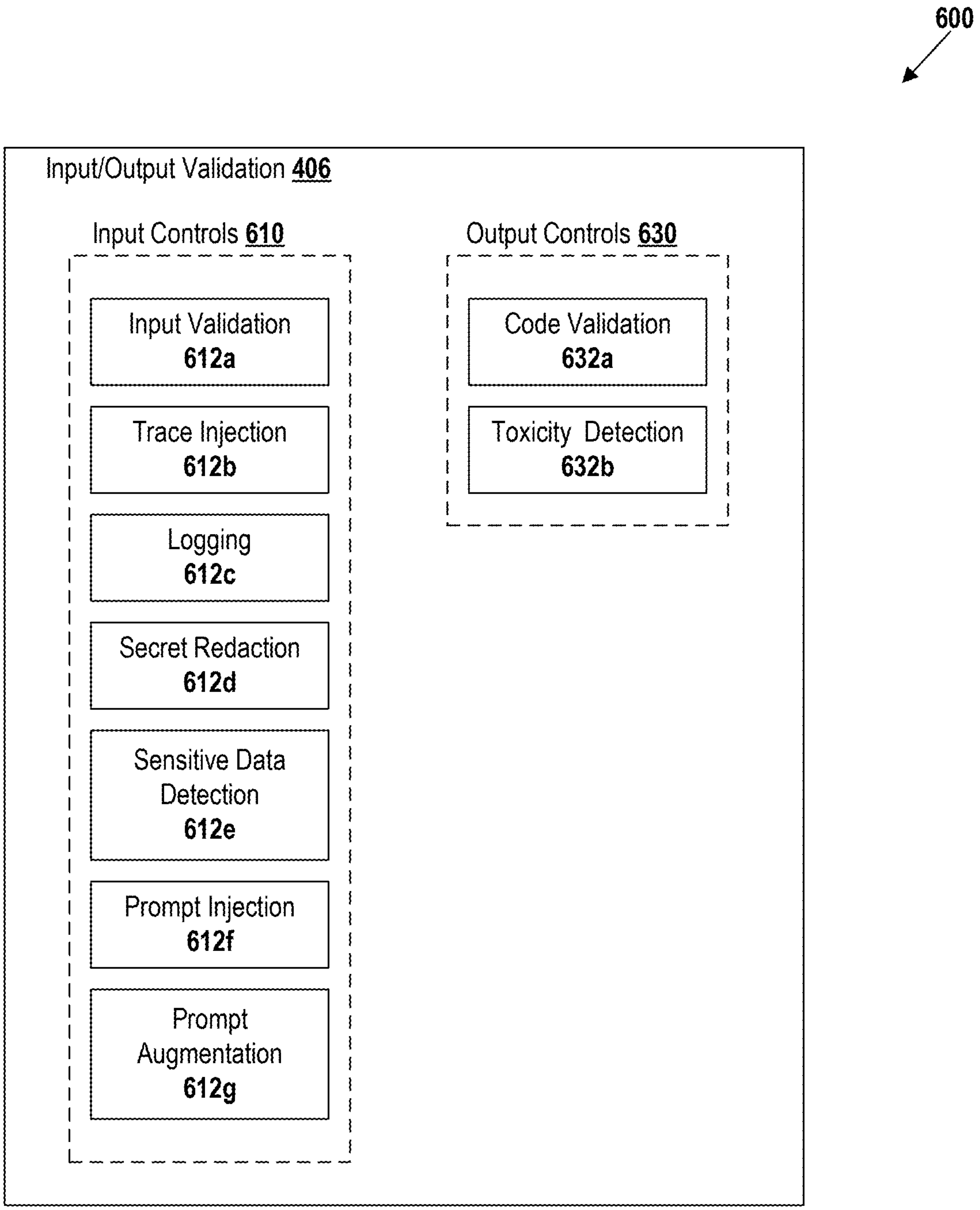
FIG. 6 shows a schematic illustrating components of input/output validation, in accordance with some implementations of the present technology.

FIG. 6 shows a schematic 600 illustrating components of input/output validation, in accordance with some implementations of the present technology. For example, input/output validation 406 (e.g., through breach mitigation engine 116) includes input controls 610 (e.g., associated with prompt validation) that include one or more prompt validation models. The input/output validation 406 can additionally or alternatively include output controls 630, as discussed below. Modules, components, or models associated with the input/output validation 406 can be updated, modified, added, removed, activated, or deactivated (e.g., according to attributes of the output generation request, a classification of the user, or other suitable factors). Thus the breach mitigation engine 116 (and the data generation platform 102) are flexible, modular, and configurable in an application-specific manner.

A prompt (e.g., input) validation model can include a module (e.g., a software component), model, algorithm, or process for validating, authenticating, modifying, and/or controlling inputs (e.g., to LLMs). For example, a prompt validation model includes one or more input controls 610, as shown in FIG. 6. Additionally or alternatively, the input controls 610 can include one or more prompt validation models capable of executing operations including input validation 612*a*, trace injection 612*b*, logging 612*c*, secret redaction 612*d*, sensitive data detection 612*e*, prompt injection 612*f*, and/or prompt augmentation 612*g*. A prompt validation model can generate a validation indicator. The validation indicator can indicate a validation status (e.g., a binary indicator specifying whether the prompt is suitable for provision to the associated LLM). Additionally or alternatively, the validation indicator can indicate or specify aspects of the prompt that are validated and/or invalid, thereby enabling further modification to cure any associated deficiencies in the prompt.

Input validation 612*a* can include validation of parameters associated with the input. For example, the breach mitigation engine 116 retrieves a maximum size (e.g., in terms of character length or binary storage size) that is allowed for the prompt and/or the output generation request and determines that the prompt satisfies this maximum size. The breach mitigation engine 116 can determine whether the prompt satisfies other criteria (e.g., relating to allowed characters/tokens, prompt language, formats, and/or other criteria).

Trace injection 612*b* can include the generation of a trace token (e.g., a word, phrase, or other component) for inclusion within the prompt, for further tracking, monitoring, or evaluation of the performance of the LLM with respect to the trace token. For example, the trace token includes a character that is not processed by the LLM and/or processed differently. Additionally or alternatively, the trace token can include a prompt or instructions for the LLM to explicitly track or include a token within the generated output (e.g., to ensure that the prompt and resulting output are not modified or intercepted by malicious entities. As such, trace injection can improve the stability, security, and troubleshooting capabilities of the associated development pipeline.

Logging 612*c* can include recording, monitoring, and tracking of events associated with prompt evaluation and/or output generation/validation. For example, the breach mitigation engine 116 generates records of output generation requests by users or services and transmit these records to suitable systems or databases for storage (e.g., to the data consumption system 422). Additionally or alternatively, the breach mitigation engine 116 generates metrics associated with the system (e.g., relating to system resource usage, such as memory usage, CPU usage, or other suitable metrics) and can transmit these metrics and corresponding values to an event database (e.g., the metric evaluation database 416) via the communication engine 112 of FIG. 1. The breach mitigation engine 116 can generate event records associated with events or actions relating to the breach mitigation engine 116. For example, a record (e.g., an event record) includes an associated timestamp, entity (e.g., a user performing the action, such as transmitting an output generation request), and an associated outcome (e.g., an action taken in response to the event). In some implementations, the event record includes other information relating to the state of the data generation platform 102. The event record can include information relating to LLMs (e.g., including outputs from LLMs) or other suitable information. By generating such information and transmitting this information to a suitable database, the data generation platform 102 enables monitoring, troubleshooting, and evaluation of the health and efficiency of the development pipeline.

Sensitive data detection 612*e* can include detection of sensitive information within the prompt and/or output generation request. For example, the breach mitigation engine 116 determines that the prompt includes tokens (e.g., words or phrases) that are associated with secure information (e.g., PII), such as names, dates of birth, or identification numbers (e.g., social security numbers). Based on this detection, the breach mitigation engine 116 can determine whether or not to provide the prompt to one or more LLMs 410. By doing so, the breach mitigation engine 116 can prevent leakage of sensitive information to entities that manage or have access to LLM input data (e.g., entities with access to servers associated with the LLMs). In some implementations the breach mitigation engine 116 can determine the presence of sensitive data by determining that a token (e.g., a character, word, or phrase) of the prompt matches a stored sensitive token within a sensitive token database (e.g., the sensitive token database 414 of FIG. 4). Secret redaction 612*d* can include modifying the prompt to remove secrets (e.g., sensitive information). For example, based on sensitive data detection 612*e*, the breach mitigation engine 116 replaces or removes sensitive tokens found within the prompt to generate a modified prompt. In some implementations, the breach mitigation engine 116 can determine that the prompt includes a forbidden token (e.g., a swear word, or another undesirable natural language token, as specified within a forbidden token database). Based on this determination, the breach mitigation engine 116 can modify the prompt (e.g., by removing the forbidden token) prior to providing the prompt to a suitable LLM for processing. For example, the breach mitigation engine 116 replaces the sensitive or forbidden tokens with alternative, non-sensitive tokens. By doing so, the breach mitigation engine 116 enables masking of sensitive data to prevent exposure of such data to other external systems.

Prompt injection 612*f* can include detection of prompt injection attacks, including manipulation of prompts to alter the results. For example, the breach mitigation engine 116 generates a modified prompt that includes the user-provided prompt from the output generation request, where the modified prompt is configured to test whether the user-provided prompt manipulates the prompt logic. The prompt injection 612*f* can provide this modified prompt to a machine learning model designed to test for prompt injection attacks; this machine learning model can generate a validation indicator specifying a likelihood that the user-provided prompt is manipulating the prompt logic of the data generation platform 102's LLMs. By doing so, the breach mitigation engine 116 can prevent prompt injection attacks or other malicious attempts to manipulate the system.

Prompt augmentation 612*g* can include adding tokens (e.g., sentences or phrases) to the prompt to improve output generation behavior. For example, the breach mitigation engine 116 generates tokens to improve the register, language, or style of the generated outputs (e.g., by including a statement requesting that the generated output correspond to a given style within the prompt). By doing so, the breach mitigation engine 116 can improve the quality of LLM-generated information in a flexible, modular manner (e.g., as specified by administrator systems of the data generation platform 102).

The data generation platform 102 (e.g., through the breach mitigation engine 116) can determine a subset of input controls 610 to implement for a given output generation request. For example, the data generation platform 102 selects a subset of the input controls 610 based on one or more attributes associated with the output generation request. To illustrate, the breach mitigation engine 116 can determine to implement input validation 612*a*, trace injection 612*b* and prompt injection 612*f* for a prompt that is related to software development, while adding secret redaction 612*d* and/or sensitive data detection 612*e* for a prompt that is related to user account analytics (e.g., for an application that is more likely to be associated with sensitive information). By modularly selecting controls depending on the application or use case of the output generation request, the data generation platform 102 can improve system efficiency by avoiding unnecessary controls, while maintaining prompt generation security and reliability.

The breach mitigation engine 116 can provide the modified and/or validated prompt to the performance engine 118 for determination of performance impacts (e.g., for performance evaluation 408) associated with providing the prompt to an LLM (e.g., one of LLMs 410). For example, the performance engine 118 determines a performance metric value (e.g., corresponding to an estimated resource requirement) associated with processing the prompt through an LLM to generate an output. An estimated performance metric value can include an indication of an estimated resource use, such as a monetary cost (e.g., cost metric) associated with an API call to the requested LLM. For example, referring to FIG. 5, the performance engine 118 determines an estimated resource use 510, such as a monetary cost, for processing the prompt with the selected LLM. The data generation platform 102, through the communication engine 112, can display the estimated cost on a user interface associated with the user device. As discussed in relation to FIG. 9 below, the data generation platform 102 can determine a threshold metric value associated with the performance metric.

Additionally or alternatively, the performance metric includes an indication of computational resources associated with processing the request (e.g., a bandwidth required to transmit the prompt to the LLM and/or execute the associated API call). The indication of computational resources can include memory or storage requirements (e.g., a storage size associated with the prompt or the estimated output storage size) for processing the prompt. For example, an estimated performance metric value associated with a memory performance metric includes an estimate of memory space (e.g., a memory size) associated with operations in order to generate output associated with the prompt. As discussed in relation to FIG. 9 below, the data generation platform 102 can determine the maximum memory size (e.g., corresponding to a threshold metric value) based on a system state (e.g., at a time of receipt of the output generation request).

Additionally or alternatively, the estimated resource requirement (e.g., an estimated performance metric or usage value associated with computational resources) includes an estimate of CPU processing speeds and/or time associated with the processing the request. For example, the data generation platform 102 determines an estimated maximum or average CPU utilization value associated with generating, using a particular LLM, an output based on the prompt. The CPU utilization value can include an indication of a percentage of time spent processing non-idle tasks associated with generating the output with respect to a total processing time. As discussed in relation to FIG. 9 below, the data generation platform 102 can determine a maximum usage value corresponding to the threshold metric value. For example, the data generation platform 102 determines a maximum CPU utilization value based on a baseline CPU usage associated with processors of the computing system. By doing so, the data generation platform 102 can ensure satisfactory computational performance by preventing LLM output generation where computational resources are insufficient for the task.

In some implementations, the performance metric includes the number of machine learning models required/recommended to process the request. The threshold performance metric value can include a maximum number of requests per minute (e.g., a throughput). In some implementations, the estimated performance metric value includes a number of prompt tokens per request (e.g., a number of words, phrases, or other natural language or numerical units within the request). Additionally or alternatively, the estimated performance metric value includes a number (e.g., estimated) of response or output tokens per request (e.g., a number of words, phrases, or other natural language or numerical units within an output in response to the request).

The breach mitigation engine 116 can compare the performance metric value with a threshold metric value (e.g., can compare the estimated cost with a threshold cost). To illustrate, the breach mitigation engine 116 can determine whether the estimated cost is greater than, equal to, or less than the threshold cost. The threshold metric value (e.g., the threshold cost) can be determined based on or dependent on the selected LLM (e.g., the LLM selected via the GUI 500 using the user control 502). For example, different LLMs includes different limits or requirements relating to resource use. Furthermore, the threshold metric can depend on the user (e.g., the user device 402*a* of FIG. 4) and/or the service 402*b*. For example, the threshold metric includes resource allotments that are specific to particular users of the data generation platform 102. In some implementations, the GUI 500 (e.g., as shown in FIG. 5) includes an indication of the user's allotment and a running indication of resource usage (e.g., as a percentage of the user's allotment). The threshold metric can be dependent on attributes of the output generation request. For example, prompts associated with particular technical applications cause the data generation platform 102 to determine different threshold metrics accordingly.

The data generation platform 102 can determine that the estimated resource metric value (e.g., the estimated cost) does not satisfy the threshold metric value. For example, the data generation platform 102 determines that the estimated cost is greater than or equal to the threshold cost. Based on this determination, the performance evaluation 408 can determine to prevent provision of the associated prompt to one or more LLMs of the LLMs 410. Additionally or alternatively, the data generation platform 102 can determine another LLM (e.g., a second LLM) for which the associated performance metric value satisfies threshold metric value (e.g., where the estimated cost is less than the threshold cost) and re-route the prompt to this second LLM. As such, the data generation platform 102 can dynamically select LLMs for processing output generation requests on the basis of estimated system resources and associated limitations or requirements, thereby improving the efficiency, flexibility, and robustness of the associated development pipeline.

In some implementations, the data generation platform 102 can generate more than one performance metric value for the output generation request. For example, the data generation platform 102 receives an indication of one or more performance metrics from the user associated with the query generation request. The data generation platform 102 can determine a value corresponding to each performance metric. The data generation platform 102 can determine threshold metric values associated with each performance metric. As such, the data generation platform 102 can compare each performance metric value with the threshold metric value. In some implementations, the data generation platform 102 can determine that each performance metric value meets the associated threshold performance metric value, and, based on this determination, the data generation platform 102 can determine whether to provide the query to a suitable LLM. Additionally or alternatively, the data generation platform 102 can generate a composite performance metric value based on the determined performance metric values. The data generation platform 102 can compare the composite value with a threshold composite value in order to determine whether to provide the query to a suitable LLM. In some implementations, the data generation platform 102 can receive user input that selects particular performance metrics (e.g., in an order of priority) for determination of corresponding values. For example, the data generation platform 102 can determine the composite performance metric value based on weights that correspond to the order of priority.

Based on providing the modified inputs (e.g., prompts) to a suitable LLM, the data generation platform 102, through the generative model engine 120, can generate an output. For example, the data generation platform 102 generates a response to a query posed within the prompt of the output generation request. To illustrate, the output can include generated natural language (e.g., in the form of alphanumeric strings of characters), code (e.g., portions of code, such as code samples), or other generated outputs. The output can include one or more images, videos, audio, and/or combinations thereof. For example, a model can output a combination of an image, text, and/or a video (e.g., multimodal outputs). In some implementations, the LLM generates audio data (e.g., corresponding to speech), videos, or images based on the input prompt. As such, the data generation platform 102 can include flexible, modular generative machine learning models for a variety of applications.

The data generation platform can include one or more machine learning models (e.g., LLMs). An LLM can include a model, algorithm, or routine for natural-language processing or generation tasks. An LLM can include an artificial neural network, such as using a decoder-only, encoder-only, or an encoder-decoder-type transformer-based architecture, a recurrent neural network, and/or a state space model. For example, an LLM is configured or trained using reinforcement learning from human feedback (RLHF), instruction tuning, and/or mixture-of-experts. In some implementations, the LLM can include prompt engineering, an attention mechanism, or a context window.

In some implementations, the model (e.g., LLM) includes augmented or modified LLMs, such as retrieval-augmented generation (RAG) algorithms. A RAG algorithm can include a document retriever (and/or another type of retriever). For example, the retriever can determine, based on the prompt, one or more relevant documents (or other suitable text records, as in a textual database). For example, the document retriever can encode the query within a vector space, as well as the documents, and determine relevant documents based on their distance from the query within the vector space. The LLM can generate an output based on the query and the retrieved documents, thereby improving the accuracy and relevance of the generated outputs.

In some implementations, the model includes a chain-of-thought algorithm. Chain-of-thought prompting can include the execution of intermediate steps before the generation of a final output based on an input query. For example, the LLM can modify the query to include one or more requests or indications to cause the LLM to generate a step-by-step output in response to the input query. By doing so, the LLM can improve the accuracy of generated outputs, as well as the reliability of the LLM with respect to logical reasoning-dependent tasks.

In some implementations, the model includes a prompt analysis algorithm. A prompt analysis algorithm can include a mechanism for evaluating prompts prior to submission to the LLM (e.g., through text prediction or auto-complete). In some implementations, the LLM includes domain-specific information. For example, the LLM can be trained or can be provided with (e.g., through a modified prompt) domain-specific information associated with the query (e.g., based on a target application).

In some implementations, the machine learning model includes any suitable algorithms, including supervised or unsupervised machine learning algorithms, decision trees, neural networks, probabilistic classifiers, or any other suitable algorithms. As such, the machine learning models of the data generation platform can receive a variety of types of inputs and can output a variety of types of outputs, thereby improving the flexibility, modularity, and customizability of the data generation platform.

The data generation platform 102, through the breach mitigation engine 116, can evaluate the output generated through the LLM. For example, the breach mitigation engine 116 implements one or more output controls 630, as exemplified in FIG. 6. The output controls 630 can include modules, algorithms, limits, restrictions, criteria, or evaluation protocols for evaluating, protecting, or controlling outputs from the LLM. For example, output controls include code validation 632*a* and/or toxicity detection 632*b*.

Code validation 632*a* can include validating the syntax, compilation, and/or execution of generated code. For example, the breach mitigation engine 116 generates, executes, or determines an executable program or a software routine associated with the executable program based on the generated code. As such, the breach mitigation engine 116 can execute this software routine within a virtual machine or any other suitable isolated environment to test the effects of the program. To illustrate, the breach mitigation engine 116 can transmit the code generated from an LLM and/or the associated compiled code to an output validation model 420 (e.g., as shown in FIG. 4). For example, the data generation platform 102 evaluates the output of the executable program and/or inspect the environment after execution to detect any potential adverse impacts of the generated code. The breach mitigation engine 116 can cause execution of the model within this validation model, thereby enabling evaluation of the generated code in a secure environment. By doing so, the data generation platform 102 can mitigate possible errors, bugs, or malicious behavior associated with generated code.

Toxicity detection 632*b* can include a process for evaluating the toxicity (e.g., the inappropriateness) of a machine learning model's output (e.g., the toxicity of generated natural language data, such as text). For example, toxicity detection includes detection of unfavorable, inappropriate, or unhelpful outputs. In some implementations, the data generation platform 102 can transmit the generated output from an LLM to a toxicity detection model trained using human-generated training data regarding the toxicity of generated natural language outputs. In some implementations, the toxicity detection 632*b* can include an indication of the toxicity of an output with respect to a numerical scale of toxicity.

Based on output controls, the data generation platform 102 can generate a validation indicator indicating the validity, toxicity, or safety of the generated output. For example, the validation indicator includes a binary indicator associated with whether the generated output is toxic and/or safe. In some implementations, the validation indicator can include a metric value (e.g., on a scale from 0 to 1) quantifying the suitability or appropriateness of the generated output (e.g., through a sentiment analysis algorithm). In response to the validation indicator, the data generation platform 102 can further modify, hide, or control the output (e.g., using modules associated with the input controls 610). By doing so, the data generation platform 102 can improve the accuracy, security, and privacy of data generated through LLMs, to prevent leakages or inaccuracies in such data.

The data generation platform 102 can provide these generated outputs to a data consumption system 422, as shown in FIG. 4. For example, the data consumption system 422 includes a server system that enables access to the output (e.g., as validated or modified by the data generation platform 102) for the user through the associated user device. In some implementations, data associated with or including the prompt, the input controls, the output controls, and/or the output can be stored within the data consumption system 422 for further training, evaluation, and processing by an associated administrator system.

Process for Validating LLM Inputs and Outputs

Figure 7:
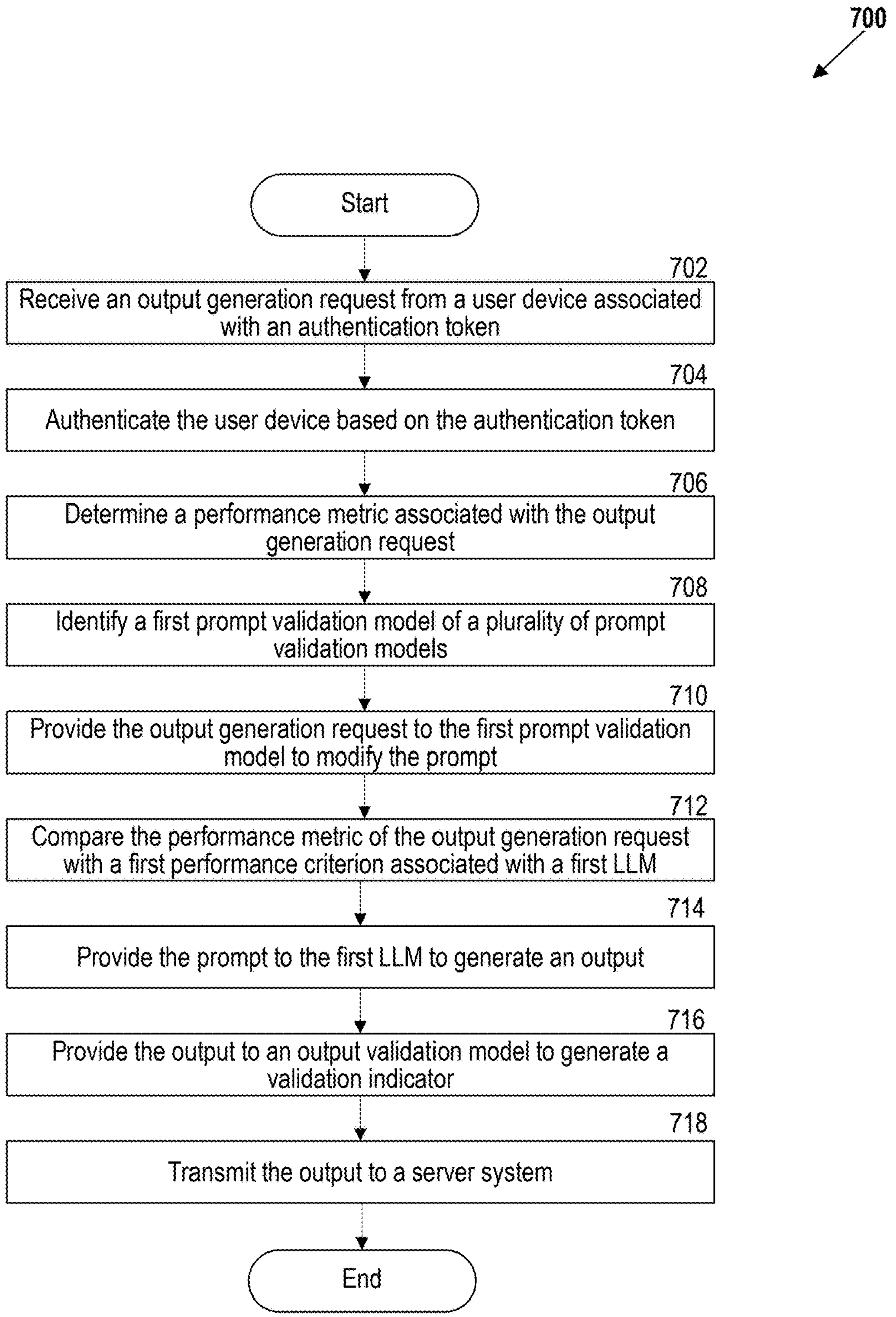
FIG. 7 shows a flow diagram illustrating a process for evaluating natural language prompts for model selection and for validating generated responses, in accordance with some implementations of the present technology.

FIG. 7 shows a flow diagram illustrating a process 700 for the dynamic evaluation of large-language model prompts and validation of the resulting outputs, in accordance with some implementations of the present technology. For example, the process 700 is used to generate data and/or code for in the context of data processing or software development pipelines.

At act 702, process 700 can receive an output generation request from a user device (e.g., where the user device is associated with an authentication token). For example, the data generation platform 102 receives an output generation request from a user device, where the user device is associated with an authentication token, and where the output generation request includes a prompt for generation of a text-based output using a first large-language model (LLM). As an illustrative example, the data generation platform 102 receives a request from a user, through a computing device, indicating a query to request the generation of code for a software application. The request can include a user identifier, such as a username, as well as a specification of a particular requested LLM architecture. By receiving such a request, the data generation platform 102 can evaluate the prompt and generate a resulting output in an efficient, secure manner.

In some implementations, process 700 can generate an event record that describes the output generation request. For example, the data generation platform 102 generates, based on the output generation request, an event record including the performance metric value, a user identifier associated with the user device, and the prompt. The data generation platform 102 can transmit, to the server system, the event record for storage in an event database. As an illustrative example, the data generation platform 102 can generate a log of requests from users for generation of outputs (e.g., including the user identifier and associated timestamp). By doing so, the data generation platform 102 can track, monitor, and evaluate the use of system resources, such as LLMs, thereby conferring improved control to system administrators to improve the effectiveness of troubleshooting and system resource orchestration.

At act 704, process 700 can authenticate the user. For example, the data generation platform 102 authenticates the user device based on the authentication token (e.g., credentials associated with the output generation request). As an illustrative example, the data generation platform 102 can identify the user associated with the output generation request and determine whether the user is allowed to submit a request (e.g., and/or whether the user is allowed to select an associated LLM). By evaluating the authentication status of the user, the data generation platform 102 can protect the associated software development pipeline from malicious or unauthorized use.

In some implementations, process 700 can compare the authentication token with a token stored within an authentication database in order to authenticate the user. For example, the data generation platform 102 determines a user identifier associated with the user device. The data generation platform 102 can determine, from a token database, a stored token associated with the user identifier. The data generation platform 102 can compare the stored token and the authentication token associated with the output generation request. In response to determining that the stored token and the authentication token associated with the output generation request match, the data generation platform 102 can authenticate the user device. As an illustrative example, the data generation platform 102 can compare a first one-time password assigned to a user (e.g., as stored within an authentication database) with a second one-time password provided along with the authentication request. By confirming that the first and second passwords match, the data generation platform 102 can ensure that the user submitting the output generation request is authorized to interact to use the requested LLMs.

At act 706, process 700 can determine a performance metric value associated with the output generation request. For example, the data generation platform 102 determines a performance metric value associated with the output generation request, where the performance metric value indicates an estimated resource requirement for the output generation request. As an illustrative example, the data generation platform 102 can determine an estimated memory usage associated with the output generation request (e.g., an estimated memory size needed by the associated LLM to generate the requested output based on the input prompt). By doing so, the data generation platform 102 can determine the load or burden on the system associated with the user's request, thereby enabling the data generation platform 102 to evaluate and suggest resource use optimization strategies to improve the efficiency of the associated development pipeline.

At act 708, process 700 can identify a prompt validation model, for validation of the output generation request, based on an attribute of the request. For example, the data generation platform 102 identifies, based on an attribute of the output generation request, a first prompt validation model of a plurality of prompt validation models (e.g., of a set of input controls). As an illustrative example, the data generation platform 102 can determine a technical application or type of requested output associated with the prompt. The attribute can include an indication that the prompt is requesting code (e.g., for software development purposes). Based on this attribute, the data generation platform 102 can determine a prompt validation model (e.g., an input control) that is suitable for the given prompt or output generation request. By doing so, the data generation platform 102 enables tailored, flexible, and modular controls or safety checks on prompts provided by users, thereby improving the efficiency of the system will targeting possible vulnerabilities in a prompt-specific manner.

At act 710, process 700 can provide the output generation request to the identified model for modification of the prompt. For example, the data generation platform 102 provides the output generation request to the first prompt validation model to modify the prompt. As an illustrative example, the data generation platform 102 can execute one or more input controls to evaluate the prompt, including trace injection, prompt injection, logging, secret redaction, sensitive data detection, prompt augmentation, or input validation. By doing so, the data generation platform 102 can improve the accuracy, security, and stability of prompts that are subsequently provided to LLMs, thereby preventing unintended data leakage (e.g., of sensitive information), malicious prompt manipulation, or other adverse effects.

In some implementations, process 700 can replace or hide sensitive data within the user's prompt. For example, the data generation platform 102 determines that the prompt includes a first alphanumeric token. The data generation platform 102 can determine that one or more records in a sensitive token database include a representation of the first alphanumeric token. The data generation platform 102 can modify the prompt to include a second alphanumeric token in lieu of the first alphanumeric token, where the sensitive token database does not include a record representing the second alphanumeric token. As an illustrative example, the data generation platform 102 can detect that the prompt includes sensitive information (e.g., PII), such as users' personal names, social security numbers, or birthdays. By masking such information, the data generation platform 102 can ensure that such sensitive information is not leaked to or provided to external systems (e.g., via an API request to an externally-housed LLM), thereby mitigating security breaches associated with LLM use.

In some implementations, process 700 can remove forbidden tokens from the user's prompt. For example, the data generation platform 102 determines that the prompt includes a forbidden token. The data generation platform 102 can generate the modified prompt by omitting the forbidden token. As an illustrative example, the data generation platform 102 can determine whether the user's prompt includes inappropriate or impermissible tokens, such as words, phrases, or sentences that are associated with swear words. The data generation platform 102 can mask or replace such inappropriate tokens, thereby improving the quality of inputs to the target LLM and preventing unintended or undesirable outputs as a result.

In some implementations, process 700 can inject a trace token into the user's prompt to improve model evaluation and tracking capabilities. For example, the data generation platform 102 can generate a trace token comprising a traceable alphanumeric token. The data generation platform 102 can generate the modified prompt to include the trace token. As an illustrative example, the data generation platform 102 can inject (e.g., by modifying the prompt to include) tokens, such as characters, words, or phrases, that are designed to enable tracking, evaluation, or monitoring of the prompt any resulting outputs. By doing so, the data generation platform 102 enables evaluation and troubleshooting with respect to LLM outputs (e.g., to detect or prevent prompt manipulation or interception of the prompt or output by malicious actors).

At act 712, process 700 can compare the performance metric value with a performance criterion (e.g., a threshold metric value) that is related to the LLM associated with the output generation request. For example, the data generation platform 102 compares the performance metric value of the output generation request with a first performance criterion associated with the first LLM of a plurality of LLMs. As an illustrative example, the data generation platform 102 can compare a requirement of system resources for execution of the LLM using the given prompt with a threshold value (e.g., as associated with the LLM, the user, and/or the attribute of the output generation request). For example, the data generation platform 102 can compare an estimated system memory usage for use of the LLM with an available system memory availability to determine whether the LLM can be used without adversely affecting the associated computing system. By doing so, the data generation platform 102 can prevent unintended system-wide issues regarding resource use.

In some implementations, process 700 can generate a cost metric value and determine whether the cost metric value satisfies a threshold cost (e.g., a threshold associated with the performance criterion). For example, the data generation platform 102 generates a cost metric value associated with the estimated resource requirement for the output generation request. The data generation platform 102 can determine a threshold cost associated with the first LLM. The data generation platform 102 can determine that the cost metric value satisfies the threshold cost. As an illustrative example, the data generation platform 102 can determine a monetary cost associated with running the LLM with the requested prompt. Based on determining that the cost is greater than a threshold cost (e.g., a remaining budget within the user's allotment), the data generation platform 102 can determine not to provide the prompt to the LLM. Additionally or alternatively, the data generation platform 102 can determine that the cost is less than the threshold cost and, in response to this determination, proceed to provide the prompt to the LLM. By doing so, the data generation platform 102 provides improved flexibility and/or control over the use of system resources (including memory, computational, and/or financial resources), enabling optimization of the associated development pipeline.

At act 714, process 700 can provide the prompt (e.g., as modified by suitable prompt validation models) to the LLM generate the requested output. For example, in response to determining that the performance metric satisfies the first performance criterion, the data generation platform 102 provides the prompt to the first LLM to generate an output. As an illustrative example, the data generation platform 102 can generate a vector representation of the prompt (e.g., using a vectorization system and/or the vector database) and provide the vector representation to a transformer model and/or a neural network associated with an LLM (e.g., through an API call). By doing so, the data generation platform 102 can generate a resulting output (e.g., generated code or natural language data) in response to a query submitted by the user within the prompt.

At act 716, process 700 can validate the output from the LLM. For example, the data generation platform 102 provides the output to an output validation model to generate a validation indicator associated with the output. As an illustrative example, the data generation platform 102 can validate the output of the LLM to prevent security breaches or unintended behavior. For example, the data generation platform 102 can review output text using a toxicity detection model and determine an indication of whether the output is valid or invalid. In some implementations, the data generation platform 102 can determine a sentiment associated with the output and modify the output (e.g., by resubmitting the output to the LLM) to modify the sentiment associated with the output. By doing so, the data generation platform 102 can ensure the accuracy, utility, and reliability of generated data.

In some implementations, process 700 can validate the output by generating and testing an executable program compiled on the basis of the output. For example, the data generation platform 102 extracts a code sample from the output, where the code sample includes code for a software routine. The data generation platform 102 can compile, within a virtual machine of the system, the code sample to generate an executable program associated with the software routine. The data generation platform 102 can execute, within the virtual machine, the software routine using the executable program. The data generation platform 102 can detect an anomaly in the execution of the software routine. In response to detecting the anomaly in the execution of the software routine, the data generation platform 102 can generate the validation indicator to include an indication of the anomaly. As an illustrative example, the data generation platform 102 can generate a validation indicator based on determining that the output contains code and testing the code (and/or the compiled version of the code) in an isolated environment for potential adverse effects, viruses, or bugs. By doing so, the data generation platform 102 can ensure the safety and security of generated code, thereby protecting the software development pipeline from security breaches or unintended behavior.

At act 718, process 700 can enable access to the output by the user. For example, in response to generating the validation indicator, the data generation platform 102 transmits the output to a server system enabling access to the output by the user device. As an illustrative example, the data generation platform 102 can provide the output to a server that enables users to access the output data (e.g., through login credentials) for consumption of the data and/or use in other downstream applications. As such, the data generation platform 102 provides a robust, flexible, and modular way to validate LLM-generated content.

Figure 8:
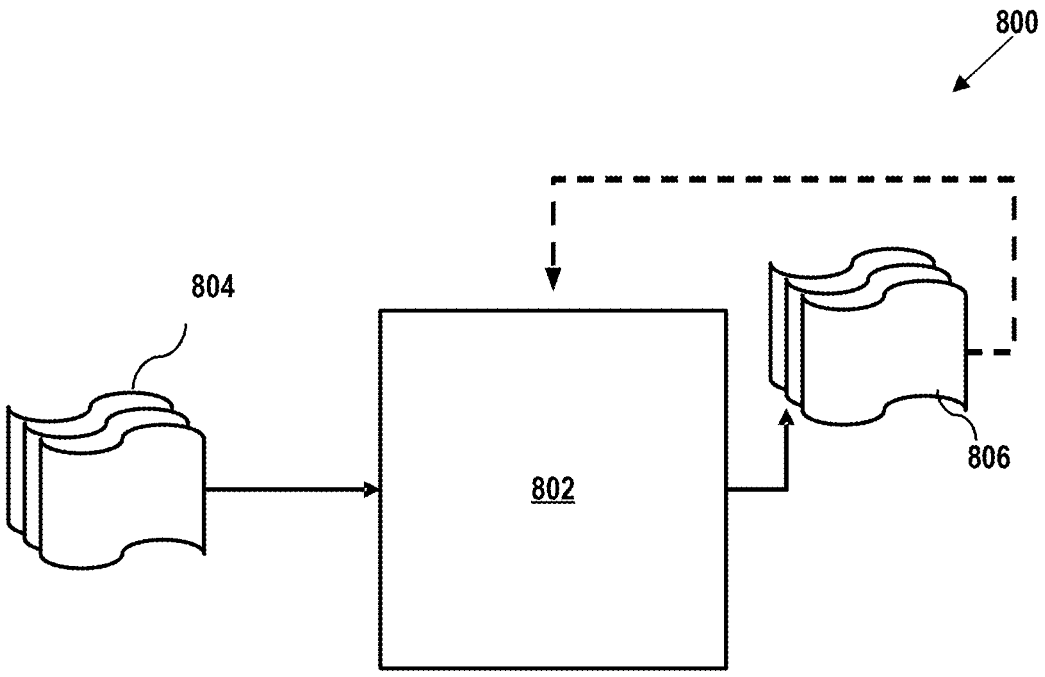
FIG. 8 shows a diagram of an artificial intelligence (AI) model, in accordance with some implementations of the present technology.

FIG. 8 shows a diagram of an AI model, in accordance with some implementations of the present technology. AI model 800 is shown. In some implementations, AI model 800 can be any AI model. In some implementations, AI model 800 can be part of, or work in conjunction with, server computing device 306 (FIG. 3). For example, server computing device 306 can store a computer program that can use information obtained from AI model 800, provide information to AI model 800, or communicate with AI model 800. In other implementations, AI model 800 can be stored in database 308 and can be retrieved by server computing device 306 to execute/process information related to AI model 800, in accordance with some implementations of the present technology.

In some implementations, AI model 800 can be a machine learning model 802. Machine learning model 802 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some embodiments, each individual neural unit can have a summation function that combines the values of all its inputs together. In some embodiments, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some embodiments, neural networks can include multiple layers (e.g., where a signal path traverses from front layers to back layers). In some embodiments, backpropagation techniques can be utilized by the neural networks, where forward stimulation is used to reset weights on the "front" neural units. In some embodiments, stimulation and inhibition for neural networks can be more free-flowing, with connections interacting in a more chaotic and complex fashion.

As an example, with respect to FIG. 8, machine learning model 802 can take inputs 804 and provide outputs 806. In one use case, outputs 806 can be fed back to machine learning model 802 as input to train machine learning model 802 (e.g., alone or in conjunction with user indications of the accuracy of outputs 806, labels associated with the inputs, or other reference feedback information). In another use case, machine learning model 802 can update its configurations (e.g., weights, biases, or other parameters) based on its assessment of its prediction (e.g., outputs 806) and reference feedback information (e.g., user indication of accuracy, reference labels, or other information). In another use case, where machine learning model 802 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 802 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Dynamic Model Selection for the Data Generation Platform

The data generation platform disclosed herein enables dynamic model selection for processing inputs (e.g., prompts) to generate associated outputs (e.g., responses to the prompts). For example, the data generation platform can redirect a prompt to a second LLM (e.g., distinct from the first LLM selected by the user within the output generation request). Additionally or alternatively, the data generation platform operates with other suitable machine learning model algorithms, inputs (e.g., including images, multimedia, or other suitable data), and outputs (e.g., including images, video, or audio). By doing so, the data generation platform 102 can mitigate adverse system performance (e.g., excessive incurred costs or overloaded memory devices or processors) by estimating system effects associated with the output generation request (e.g., the prompt) and generating an output using an appropriate model.

FIG. 9 shows a schematic of a data structure 900 illustrating a system state and associated threshold metric values, in accordance with some implementations of the present technology. For example, the data structure 900 includes usage values 904 and maximum values 906 for performance metrics 902. The data generation platform 102 can determine threshold metric values based on data associated with system performance (e.g., at the time of receipt of the output generation request). By doing so, the data generation platform 102 enables dynamic evaluation of requests for output generation, as well as dynamic selection of suitable models with which to process such requests.

As discussed in relation to FIG. 4 above, a performance metric can include an attribute of a computing system that characterizes system performance. For example, the performance metric is associated with monetary cost, system memory, system storage, processing power (e.g., through a CPU or a GPU), and/or other suitable indications of performance. The system state (e.g., a data structure associated with the system state) can include information relating to performance metrics 902, such as CPU usage, memory usage, hard disk space usage, a number of input tokens (e.g., system-wide, across one or more models associated with the data generation platform 102), and/or cost incurred. The data structure 900 corresponding to the system state can include usage values 904 and maximum values 906 associated with the respective performance metrics 902.

In some implementations, the data generation platform 102 determines a threshold metric value (e.g., of the threshold metric values 908 of FIG. 9) based on a usage value and maximum value for a corresponding performance metric (e.g., of performance metrics 902). For example, the data generation platform 102 determines a cost incurred up to a given point of time or within a predetermined time period associated with machine learning models of the data generation platform 102. The cost incurred can be stored as a usage value within the system state. For example, the usage value includes an indication of a sum of metric values for previous output generation requests, inputs (e.g., textual or non-textual prompts), or output generation instances associated with the system. The system state can include an indication of an associated maximum, minimum, or otherwise limiting value for the cost incurred or other performance metrics (e.g., an associated maximum value). By storing such information, the data generation platform 102 can determine a threshold metric value associated with generating an output using the selected model based on the prompt.

For example, the data generation platform 102 determines the threshold metric value based on a difference between the usage value and the maximum value. The data generation platform 102 can determine a threshold metric value associated with a cost allowance for processing a prompt based on a difference between a maximum value (e.g., a maximum budget) and a usage value (e.g., a cost incurred). As such, the data generation platform 102 can handle situations where the system's performance metric changes over time.

In some implementations, the data generation platform 102 can determine or predict a threshold metric value based on providing the output generation request and the system state to a threshold evaluation model. For example, the data generation platform 102 can provide the input, the indication of a selected model, and information of the system state to the threshold evaluation model to predict a threshold metric value. To illustrate, the data generation platform 102 can predict a future system state (e.g., a time-series of performance metric values associated with the system) based on the output generation request, the current system state, and the selected model. The data generation platform 102 can estimate an elapsed time for the generation of output using the requested model; based on this elapsed time, the data generation platform 102 can determine a predicted system state throughout the output generation, thereby enabling more accurate estimation of the threshold metric value. The threshold evaluation model can be trained on historical system usage (e.g., performance metric value) information associated with previous output generation requests. As such, the data generation platform 102 enables the determination of threshold metric values on a dynamic, pre-emptive basis, thereby improving the ability of the data generation platform 102 to predict and handle future performance issues.

In some implementations, the system state is generated with respect to a particular user and/or group of users. For example, the data generation platform 102 determines a system state associated with a subset of resources assigned to a given user or group of users. To illustrate, the data generation platform 102 can determine a maximum cost value associated with output generation for a given user or subset of users of the data generation platform 102. For example, the maximum cost value corresponds to a budget (e.g., a finite set of monetary resources) assigned to a particular group of users, as identified by associated user identifiers. Furthermore, the usage value can be associated with this particular group of users (e.g., corresponding to the generation of outputs using LLMs by users of the group). As such, the data generation platform 102 can determine an associated threshold metric value that is specific to the particular associated users. By doing so, data generation platform 102 enables flexible, configurable requirements and limits to system resource usage based on the identity of users submitting prompts.

In some implementations, the data generation platform 102 determines an estimated performance metric value, as discussed in relation to FIG. 4. For example, the data generation platform 102 generates the estimated performance metric value based on a performance metric evaluation model. A performance metric evaluation model can include an artificial intelligence model (e.g., or another suitable machine learning model) that is configured to predict performance metric values associated with generating outputs using machine learning models (e.g., LLMs). For example, the performance metric evaluation model can generate an estimated cost value for processing a prompt using the first LLM to generate the associated output. In some implementations, the performance metric evaluation model is trained using previous prompts and associated performance metric values. The performance metric evaluation model can be specific to a particular machine learning model or LLM. Additionally or alternatively, the performance metric evaluation model accepts an indication of a machine learning model as an input to generate the estimated performance metric value.

In some implementations, the data generation platform 102 evaluates the suitability of a prompt for a given model based on comparing a composite metric value with a threshold composite value. For example, the data generation platform 102 generates a composite performance metric value based on a combination of performance metrics (e.g., the performance metrics 902 as shown in FIG. 9). To illustrate, the data generation platform 102 can generate a composite performance metric based on multiple performance metrics of the computing system associated with the machine learning models. Based on the metric, the data generation platform 102 can generate an estimated composite metric value corresponding to the composite metric (e.g., by calculating a product of values associated with the respective performance metrics) and compare the estimated composite metric value with an associated threshold metric value. As such, data generation platform 102 enables a more holistic evaluation of the effect of a given output generation request on system resources, thereby improving the accuracy and efficiency of the data generation platform 102 in selecting a suitable model. In some implementations, the data generation platform 102 can assign particular performance metrics a respective weight and calculate a value for the composite metric accordingly. Accordingly, the data generation platform 102 enables the prioritization of relevant performance metrics (e.g., cost) over other metrics (e.g., memory usage) according to system requirements.

Figure 10:
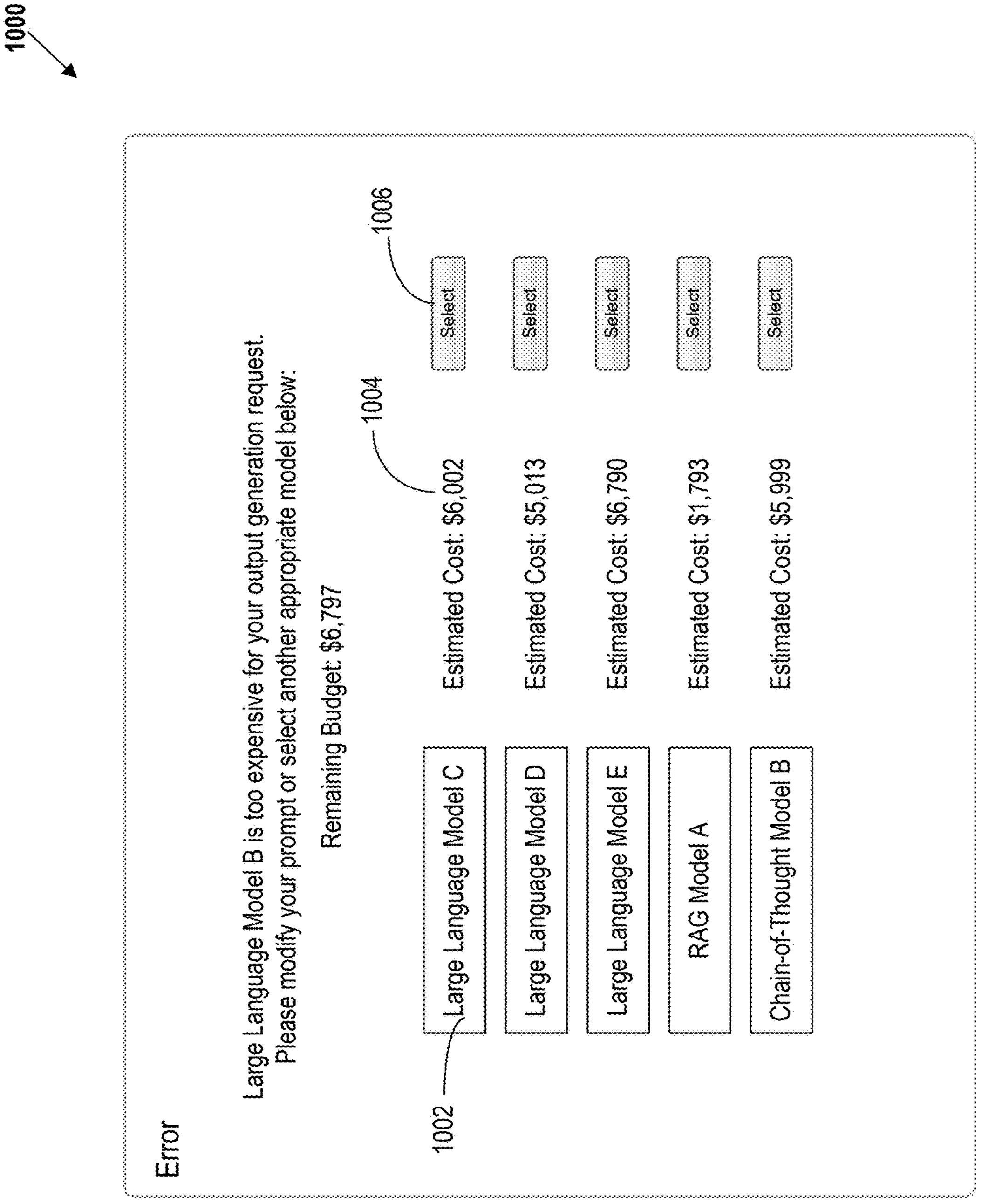
FIG. 10 shows an illustration of a GUI for enabling user selection of LLMs, in accordance with some implementations of the present technology.

FIG. 10 shows an illustration of a GUI 1000 for enabling user selection of LLMs, in accordance with some implementations of the present technology. For example, the data generation platform 102 can determine that a given estimated performance metric value does not satisfy the associated threshold metric value. In response to the determination, the data generation platform 102 can generate a request (e.g., a request for user instructions) for model selection (e.g., an LLM selection request) for display on a user interface. The request for model selection can include an indication of the resources available to the user for generation of the output (e.g., a remaining budget corresponding to the threshold metric value). In some implementations, the model selection request includes an indication of an alternative model of a plurality of models (e.g., the LLM 1002), as well as an associated estimated performance metric value (e.g., an estimated cost metric value 1004). The GUI 1000 can include associated user controls 1006 to enable selection of the associated models.

In some implementations, the GUI 1000 provides a breakdown of cost associated with various models. For example, the GUI 1000 enables a user to control a pointer (e.g., a mouse pointer) and/or a gesture (e.g., a finger) to hover over estimated cost metric values (e.g., the estimated cost metric value 1004). The data generation platform 102, based on detecting that the user is hovering over an indicator associated with the estimated cost metric value, can cause the GUI 1000 to display an indication of components associated with the estimated cost metric value 1004. For example, the GUI 1000 can display the component values making up the composite metric value for a given model (e.g., including associated weights), including CPU usage time, memory usage, and/or other estimated performance metric values. By doing so, the GUI 1000 confers information to the user relating to the estimated resource usage associated with processing the input through a given model, thereby enabling the user to select a model according to predicted system effects.

In some implementations, the data generation platform 102 provides the input or prompt (e.g., and/or the associated output generation model) to a selection model to generate a recommendation for a model, such as an LLM, for processing the prompt. To illustrate, the data generation platform 102 can provide the output generation request, including the input and/or information relating to the user, the timestamp, and/or other suitable information associated with the request. Based on this information, the data generation platform 102 can generate a recommendation for an LLM (and/or an associated model, such as a RAG or chain-of-thought model) that is suitable to generate an output based on the input. In some implementations, the selection model includes an artificial intelligence model (e.g., a classification model) to classify the input (e.g., prompt) according to associated attributes (e.g., length, subject matter, and/or the nature of the requested output). For example, the selection model generates a recommendation for a model (e.g., configured to generate code samples) based on determining that the prompt is associated with a request for software-related code. Additionally or alternatively, the selection model provides a recommendation for a model based on receiving the system state as an input. For example, the selection model generates, as output, a selection of an LLM for a provided prompt such that the estimated performance metric value satisfies the threshold metric value. As such, the selection model improves the efficiency, accuracy, and effectiveness of machine learning model-based output generation by enhancing the selection of the associated model.

Process for Validating Model Inputs and Outputs

Figure 11:
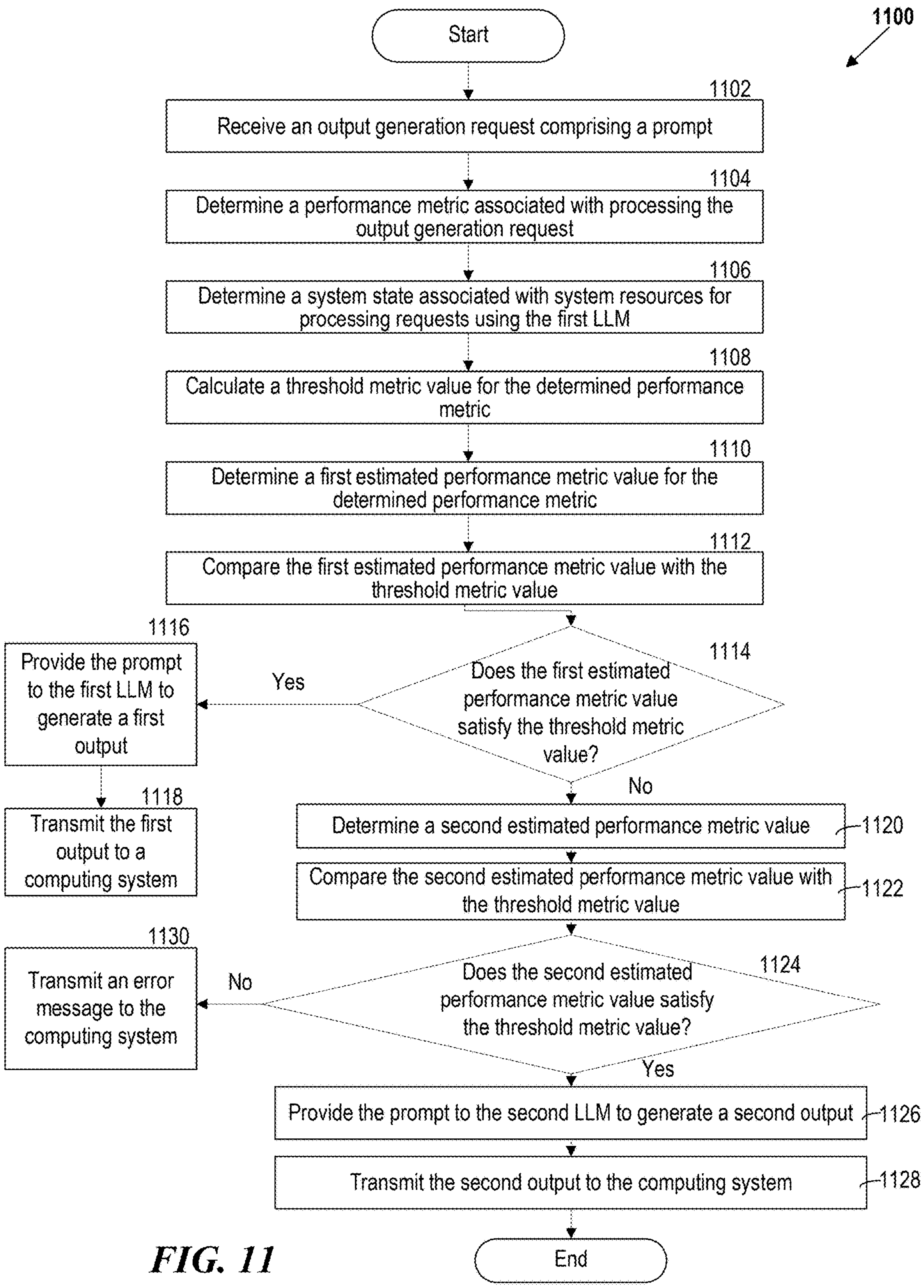
FIG. 11 shows a flow diagram illustrating a process for dynamic selection of models based on evaluation of user prompts, in accordance with some implementations of the present technology.

FIG. 11 shows a flow diagram illustrating a process 1100 for dynamic selection of models based on evaluation of user inputs (e.g., prompts), in accordance with some implementations of the present technology. For example, the process 1100 enables selection of an LLM for generation of an output (e.g., software-related code samples) based on an input (e.g., a text-based prompt) to prevent overuse of system resources (e.g., to ensure that sufficient system resources are available to process the request).

At act 1102, the process 1100 can receive an input for generation of an output using a model. For example, the process 1100 receives, from a user device, an output generation request comprising an input (e.g., prompt) for generation of an output using a first model (e.g., an LLM) of a plurality of models. As an illustrative example, the data generation platform 102 (e.g., through the communication engine 112) receives a prompt indicating a desired output, such as a text-based instruction for the generation of software-related code samples (e.g., associated with a particular function). The output generation request can include an indication of a selected model (e.g., LLM) for processing the prompt. As such, the data generation platform 102 can evaluate the effect of generating an output using the selected model based on the prompt (e.g., or other suitable inputs) on the basis of the content or nature of the request (e.g., based on a user identifier associated with the request).

At act 1104, the process 1100 can determine a performance metric associated with processing the output generation request. For example, the process 1100 determines a performance metric associated with processing the output generation request. As an illustrative example, the data generation platform 102 can determine one or more performance metrics that characterize the behavior of the system (e.g., when providing inputs to a model for generation of an output). Such performance metrics can include CPU utilization, cost (e.g., associated with the operation of the system and/or the associated models), memory usage, storage space, and/or number of input or output tokens associated with LLMs. In some implementations, the data generation platform 102 (e.g., through the performance engine 118) determines multiple performance metrics (e.g., associated with the system state) for evaluation of the effects (e.g., of generating an output based on the prompt) on the system.

At act 1106, the process 1100 can determine a system state associated with system resources. For example, the process 1100 determines a system state associated with system resources for processing requests using the first model of the plurality of models. As an illustrative example, the performance engine 118 dynamically determines a state of the system (e.g., with respect to the determined performance metrics). The system state can include an indication of values associated with performance metrics (e.g., usage values, such as CPU utilization metric values, memory usage values, hard disk space usage values, numbers of input tokens previously submitted to models within the system, and/or values of incurred cost). For example, the data generation platform 102, through communication engine 112 can query a diagnostic tool or program associated with the computing system and/or an associated database to determine values of the performance metrics. In some implementations, the system state includes maximum, minimum, or other limiting values associated with the performance metric values (e.g., a maximum cost/budget, or a maximum available memory value). By receiving information relating to the system state and associated restrictions, the data generation platform 102 can evaluate the received prompt to determine whether the selected model is suitable for generating an associated output.

At act 1108, the process 1100 can calculate a threshold metric value (e.g., associated with the output generation request). For example, the process 1100 calculate, based on the system state, a threshold metric value for the determined performance metric. As an illustrative example, the data generation platform 102 (e.g., through the performance engine 118) determines an indication of computational or monetary resources available for processing the input or prompt (e.g., to generate an associated output). The data generation platform 102 can determine an available budget (e.g., a threshold cost metric) and/or available memory space (e.g., remaining space within a memory device of the system) for processing the request. By doing so, the data generation platform 102 can evaluate the effect of generating an output based on the prompt using the specified model (e.g., LLM) with respect to system requirements or constraints.

In some implementations, the data generation platform 102 (e.g., through performance engine 118) can determine the threshold metric value to include the allowance value. For example, the performance engine 118 determines that the performance metric corresponds to a cost metric. The performance engine 118 can determine a maximum cost value associated with output generation associated with the system. The performance engine 118 can determine, based on the system state, a sum of cost metric values for previous output generation requests associated with the system. The performance engine 118 can determine, based on the maximum cost value and the sum, an allowance value corresponding to the threshold metric value. The performance engine 118 can determine the threshold metric value comprising the allowance value. As an illustrative example, the performance engine 118 determines a remaining budget associated with LLM model operations. By doing so, the performance engine 118 can mitigate cost overruns associated with output text generation, thereby improving the efficiency of the data generation platform 102.

In some implementations, the data generation platform 102 (e.g., through the performance engine 118) can determine the threshold metric value based on a user identifier and corresponding group associated with the output generation request. For example, the data generation platform 102 determines, based on the output generation request, a user identifier associated with a user of the user device. The performance engine 118 can determine, using the user identifier, a first group of users, wherein the first group comprises the use. The performance engine 118 can determine the allowance value associated with the first group of users. As an illustrative example, the performance engine 118 determines an allowance value (e.g., a budget) that is specific to a group of users associated with the user identifier (e.g., a username) of the output generation request. As such, the data generation platform 102 enables tracking of resources assigned or allocated to particular groups of users (e.g., teams), thereby improving the flexibility of allocation of system resources.

In some implementations, the data generation platform 102 (e.g., through the performance engine 118) can determine the threshold metric value based on a usage value for a computational resource. For example, the data generation platform 102 determines that the performance metric corresponds to a usage metric for a computational resource. The performance engine 118 can determine an estimated usage value for the computational resource based on the indication of an estimated computational resource usage by the first model (e.g., LLM) when processing the input (e.g., prompt) with the first model. The performance engine 118 can determine a maximum usage value for the computational resource. The performance engine 118 can determine, based on the system state, a current resource usage value for the computational resource. The performance engine 118 can determine, based on the maximum usage value and the current resource usage value, an allowance value corresponding to the threshold metric value. The performance engine 118 can determine the threshold metric value comprising the allowance value. As an illustrative example, the performance engine 118 can determine a threshold metric value based on a remaining available set of resources that are idle (e.g., processors that are not being used or free memory). As such, the data generation platform 102 enables dynamic evaluation of the state of the system for determination of whether sufficient resources are available for processing the output.

At act 1110, the process 1100 can determine an estimated performance metric value associated with processing the output generation request. For example, the process 1100 determines a first estimated performance metric value for the determined performance metric based on an indication of an estimated resource usage by the first model when processing the input included in the output generation request. As an illustrative example, the data generation platform 102 determines a prediction for resource usage for generating an output using the indicated model (e.g., an LLM associated with the determined performance metric). The data generation platform 102 (e.g., through the performance engine 118) can determine a number of input tokens within the input or prompt and predict a cost and/or a memory usage associated with processing the prompt using the selected model. By doing so, the data generation platform 102 can evaluate the effects of processing the input on system resources for evaluation of the suitability of the model for generating the requested output.

In some implementations, the data generation platform 102 generates a composite performance metric value based on more than one performance metric. For example, the performance engine 118 determines that the performance metric includes a composite metric associated with a plurality of system metrics. The performance engine 118 can determine, based on the system state, a threshold composite metric value. The performance engine 118 can determine a plurality of estimated metric values corresponding to the plurality of system metrics. Each estimated metric value of the plurality of estimated metric values can indicate a respective estimated resource usage associated with processing the output generation request with the first model. The performance engine 118 can determine, using the plurality of estimated metric values, a composite metric value associated with processing the output generation request with the first model. The performance engine 118 can determine the first estimated performance metric value comprising the composite metric value. As an illustrative example, the data generation platform 102 can generate a geometric mean of estimated values associated with various performance metrics (e.g., estimated memory usage, CPU utilization, and/or cost) and determine an associated metric. In some implementations, the data generation platform 102 can generate a weighted geometric mean based on weightings assigned to respective values of the performance metric. By doing so, the data generation platform 102 enables flexible, targeted evaluation of system behavior associated with generating outputs using LLMs.

In some implementations, the data generation platform 102 generates a performance metric value corresponding to a number of input or output tokens. For example, the first estimated performance metric value corresponds to a number of input or output tokens, and wherein the threshold metric value corresponds to a maximum number of tokens. As an illustrative example, the data generation platform 102 determines a number of input tokens (e.g., words or characters) associated with the input or prompt. Additionally or alternatively, the data generation platform 102 determines (e.g., predicts or estimates) a number of output tokens associated with the output in response to the prompt. For example, the data generation platform 102 can estimate a number of output tokens by identifying instructions or words associated with prompt length within the prompt (e.g., an instruction to keep the generated output within a particular limit). By doing so, the data generation platform 102 can compare the number of tokens associated with processing the prompt with an associated threshold number of tokens to determine whether the selected model is suitable for the generation task. As such, the data generation platform 102 can limit wordy or excessive output generation requests, thereby conserving system resources.

In some implementations, the data generation platform 102 generates the estimated performance metric value based on providing the prompt to an evaluation model. For example, the data generation platform 102 provides the input (e.g., the prompt) and an indication of the first model (e.g., LLM) to a performance metric evaluation model to generate the first estimated performance metric value. To illustrate, the data generation platform 102 can provide the input to a machine learning model (e.g., an artificial neural network) to generate an estimate of resources used (e.g., an estimated memory usage or cost) based on historical data associated with output generation. By doing so, the data generation platform 102 improves the accuracy of estimated performance metric value determination, thereby mitigating overuse of system resources.

In some implementations, the data generation platform 102 trains the evaluation model based on previous inputs (e.g., prompts) and associated performance metric values. For example, the data generation platform 102 obtains, from a first database, a plurality of training prompts and respective performance metric values associated with providing respective training prompts to the first LLM. The data generation platform 102 can provide the plurality of training prompts and respective performance metric values to the performance metric evaluation model to train the performance metric evaluation model to generate estimated performance metric values based on prompts. For example, the data generation platform 102 can retrieve previous prompts submitted by users, as well as previous system states when the prompts are submitted to the associated model (e.g., LLM). Based on these previous prompts and system states, the data generation platform 102 can train the performance metric evaluation model to generate estimated performance metrics based on inputs.

At act 1112, the process 1100 can compare the first estimated performance metric value with the threshold metric value. As an illustrative example, the data generation platform 102 can determine whether the first estimated performance metric value is greater than, equal to, and/or less than the threshold metric value. At act 1114, the process 1100 can determine whether the first estimated performance metric value satisfies the threshold metric value. (e.g., by determining that the estimated resource usage value is less than or equal to a threshold metric value). For example, the data generation platform 102 can determine whether an estimated cost value associated with processing the prompt using the first model is less than or equal to an allowance value (e.g., a remaining balance within a budget). By doing so, the data generation platform 102 can ensure that the prompt is processed when suitable system resources are available.

At act 1116, the process 1100 can provide the input (e.g., prompt) to the first model in response to determining that the first estimated performance metric value satisfies the threshold metric value. For example, in response to determining that the first estimated performance metric value satisfies the threshold metric value, the process 1100 provides the prompt to the first model to generate a first output by processing the input (e.g., prompt) included in the output generation request. As an illustrative example, the data generation platform 102 can transmit the prompt (e.g., through the communication engine 112 and/or via an associated API) to the first LLM for generation of an associated output. To illustrate, the data generation platform 102 can generate a vector representation of the prompt (e.g., through word2vec or another suitable algorithm) and generate a vector representation of the output via the first LLM. By doing so, the data generation platform 102 can process the user's output generation request with available system resources (e.g., monetary resources or computational resources).

At act 1118, the process 1100 can generate the output for display on a device associated with the user. For example, the process 1100 transmits the first output to a computing system enabling access to the first output by the user device. As an illustrative example, the data generation platform 102 (e.g., through the communication engine 112) can transmit the output from the first LLM to a computing system (e.g., a server) from which the user can access the generated output (e.g., through an API call and/or via a user interface). By doing so, the data generation platform 102 enables generation of outputs (e.g., natural language outputs) using models specified by the user when system resources are available to process associated prompts.

At act 1120, the process 1100 can determine a second estimated performance metric value associated with a second model (e.g., LLM) in response to determining that the first estimated performance metric value does not satisfy the threshold metric value. For example, in response to determining that the first estimated performance metric value does not satisfy the threshold metric value, the process 1100 determines a second estimated performance metric value for the determined performance metric based on an indication of an estimated resource usage by a second model of the plurality of models when processing the prompt included in the output generation request. As an illustrative example, the data generation platform 102 can determine a second estimate for a cost associated with processing the output with the second model and determine whether this cost estimate is consistent with the threshold cost value (e.g., determine whether the cost is less than the budget available to the user for the output generation request).

At act 1122, the process 1100 can compare the second estimated performance metric value with the threshold metric value. For example, at act 1124, the process 1100 can determine whether the second estimated performance metric value satisfies the threshold metric value. As an illustrative example, the data generation platform 102 can determine whether the cost metric value associated with processing the input (e.g., prompt) with the second model is greater than, less than, and/or equal to the threshold metric value (e.g., associated with an allowance or budget). By doing so, the data generation platform 102 can ensure that sufficient system resources are available for processing the prompt using the second model, thereby enabling redirection of output generation requests to an appropriate model when the selected model is unsuitable due to insufficient resource availability.

At act 1126, the process 1100 can generate a second output by providing the prompt to the second model in response to determining that the second estimated performance metric value satisfies the threshold metric value. For example, the process 1100 provides the prompt to the second model to generate a second output by processing the input (e.g., prompt) included in the output generation request. As an illustrative example, the data generation platform 102 (e.g., through the communication engine 112) can generate vector representations of the prompt and transmit these (e.g., via an API call) to a device associated with the second model for generation of the associated output. By doing so, the data generation platform 102 enables processing of the output generation request using a model (e.g., the second LLM) that satisfies system resource limitations or constraints, thereby improving the resilience and efficiency of the data generation platform 102.

In some implementations, the process 1100 can determine the second model based on a selection of the model by the user. For example, in response to determining that the first estimated performance metric value does not satisfy the threshold metric value, the data generation platform 102 transmits a model (e.g., LLM) selection request to the user device. In response to transmitting the model selection request, the data generation platform 102 obtains, from the user device, a selection of the second model. The data generation platform 102 can provide the input (e.g., prompt) to the second model associated with the selection. As an illustrative example, the data generation platform 102 can generate a message for the user requesting selection of another LLM for generation of an output in response to the prompt. In response to the message, the data generation platform 102 can receive instructions from the user (e.g., via a command or function) for redirection of the prompt to another suitable model that satisfies performance requirements for the system.

In some implementations, the process 1100 can determine the second model based on a selection of the model on a GUI (e.g., from a list of models with performance metrics that satisfy the performance requirements). For example, the data generation platform 102, in response to determining that the first estimated performance metric value does not satisfy the threshold metric value, generates, for display on a user interface of the user device, a request for user instructions, wherein the request for user instructions comprises a recommendation for processing the output generation request with the second model of the plurality of models. In response to generating the request for user instructions, the data generation platform 102 can receive a user instruction comprising an indication of the second model. In response to receiving the user instruction, the data generation platform 102 can provide the prompt to the second model. To illustrate, the data generation platform 102 can generate indications of one or more recommended LLMs with estimated performance metric values (e.g., estimated cost values) that are compatible with the associated threshold performance metric (e.g., a threshold cost metric). By doing so, the data generation platform 102 can present options for LLMs (e.g., that satisfy system performance constraints) for processing the user's prompt, conferring the user with increased control over output generation.

At act 1128, the process 1100 can generate the output for display on a device associated with the user. For example, the process 1100 transmits the second output to the computing system enabling access to the second output by the user device. As an illustrative example, the data generation platform 102 (e.g., through communication engine 112) transmits the second output to a computing system that enables access to the output by the user (e.g., through an associated API or GUI).

At act 1130, the process 1100 can transmit an error message to the computing system in response to determining that the second estimated performance metric value does not satisfy the threshold metric value. As an illustrative example, the data generation platform 102 (e.g., through the communication engine 112) can generate a message that indicates that the input (e.g., prompt) is unsuitable for provision the second model due to insufficient resources. Additionally or alternatively, the data generation platform

102 can determine a third model (e.g., LLM) with satisfactory performance characteristics (e.g., with a third estimated performance metric value that satisfies the threshold metric value). By doing so, the data generation platform 102 enables generation of an output based on the prompt via an LLM such that system resources are conserved or controlled.

In some implementations, the process 1100 generates a recommendation for an LLM by providing the output generation request (e.g., the associated prompt) to a selection model. For example, in response to determining that the first estimated performance metric value does not satisfy the threshold metric value, the data generation platform 102 generates, for display on a user interface of the user device, a request for user instructions. The request for user instructions can include a recommendation for processing the output generation request with the second model of the plurality of models. In response to generating the request for user instructions, the data generation platform 102 can receive a user instruction comprising an indication of the second model. In response to receiving the user instruction, the data generation platform 102 can provide the input (e.g., prompt) to the second model. As an illustrative example, the data generation platform 102 can evaluate the prompt for selection of a model that is compatible with resource requirements and/or a task associated with the output generation request. For example, the data generation platform 102 can determine an attribute associated with the prompt (e.g., that the prompt is requesting the generation of a code sample) and reroute the prompt to a model that is configured to generate software-related outputs. By doing so, the data generation platform 102 can recommend models that are well-suited to the user's requested task, thereby improving the utility of the disclosed data generation platform.

Dynamic Output Validation for the Data Generation Platform

Figure 12:
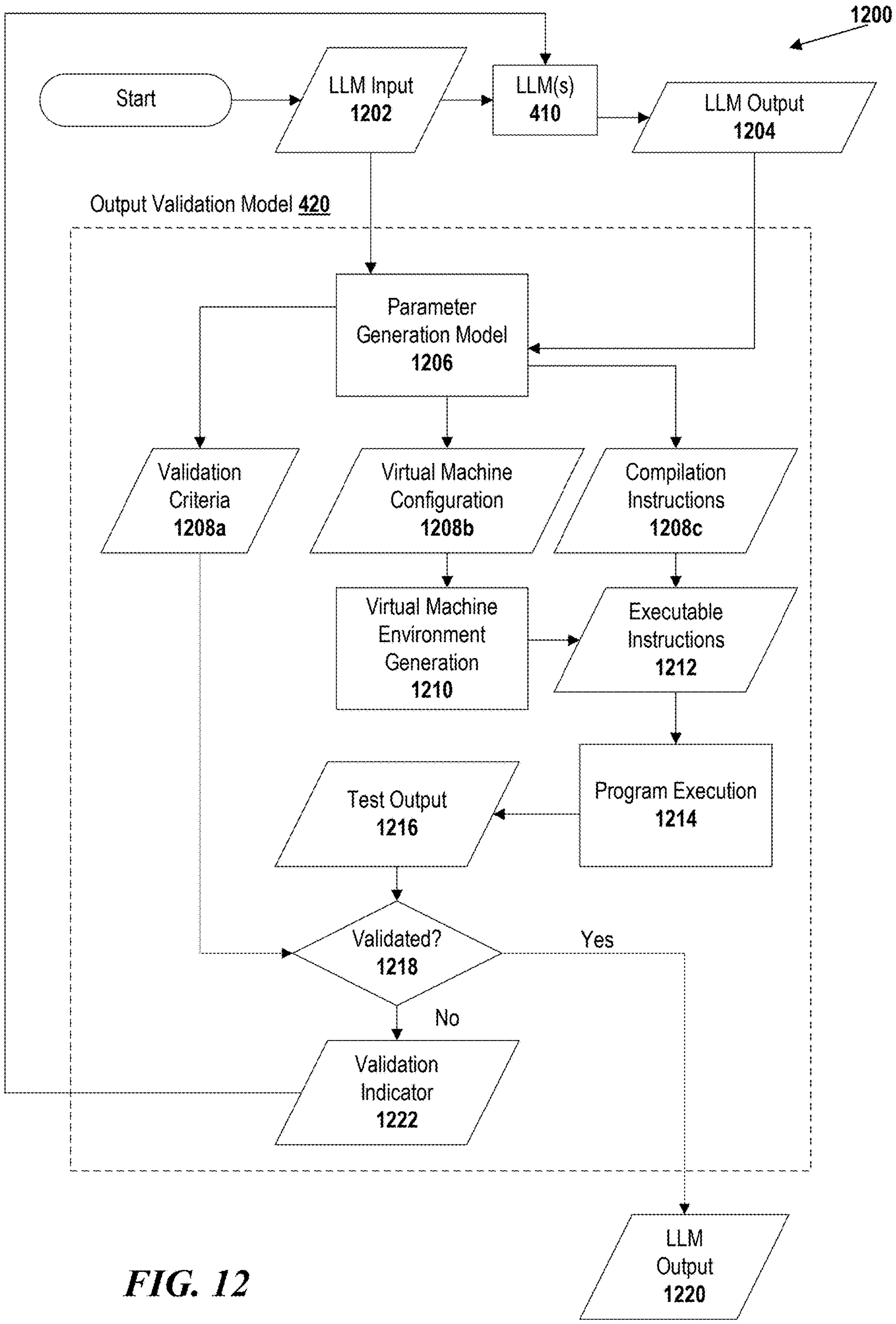
FIG. 12 shows a schematic illustrating a process for validating model outputs in an isolated environment, in accordance with some implementations of the present technology.

FIG. 12 shows a schematic illustrating a process 1200 for validating model outputs in an isolated environment, in accordance with some implementations of the present technology. The process 1200 enables the data generation platform 102 to evaluate and/or validate outputs from one or more machine learning models associated with the platform. For example, the data generation platform 102 can evaluate the safety, accuracy, and/or effects of code samples generated by an LLM in response to a user's prompt.

For example, the data generation platform 102 can receive (e.g., through the communication engine 112) an input (e.g., a prompt for an LLM, such as the LLM input 1202) for generation of software-related information by an associated machine learning model. For example, the input includes a prompt for generation of a code sample using the LLM(s) 410 of FIG. 4. In some embodiments, the input includes suitable data, including an image, video, text string, or audio recording (e.g., a voice recording). By providing the prompt (or other suitable input) to a model (e.g., one or more of LLM(s) 410, or another suitable machine learning model), the generative model engine 120 can generate an associated output, such as LLM output 1204 shown in FIG. 12, in response to the user's output generation request.

The output from a machine learning model can include a code sample. In some implementations, a code sample includes software-related information, such as character strings indicating code snippets in one or more specified programming languages. The code sample can be embedded within the model output including other text (e.g., comments, explanations, or other such information). For example, a user associated with the output generation request can request generation of code samples for use in a particular application and/or for deployment on a specified system. To illustrate, the code sample generated by a model of the data generation platform 102 can include a portion of code in a particular language that adds a functionality to an existing application (e.g., for modification of the existing application's source code to include the generated code). The code sample can include one or more function definitions, variable definitions, algorithms, processes, or other suitable information. Additionally or alternatively, the code sample includes binary/executable files and/or other software-related information or data. By generating code sample, the data generation platform 102 enables improvements to software development efficiency by reducing the need for manual writing of code. For example, the data generation platform 102 generates application code, system-level code, pseudocode, coding instructions, and/or guidance for a model (e.g., an LLM) to generate, enhance, or modify existing code.

The output validation model 420, as shown in FIG. 4, can validate the output generated by one or more machine learning models (e.g., the LLM output 1204). For example, the output validation model 420 receives the LLM output 1204 and the associated input (e.g., the LLM input 1202) and provides such data to a parameter generation model 1206 for generation of parameters associated with output validation. Such parameters can include validation criteria 1208*a*, a virtual machine configuration 1208*b*, and/or compilation instructions 1208*c*.

A parameter generation model can include a model configured to generate parameters (e.g., for a validation test). The parameter generation model 1206 can include a machine learning model (e.g., as described previously) configured to receive an input (e.g., the LLM input 1202 and/or other information associated with the output generation request, such as a user identifier), and/or a model output (e.g., the LLM output 1204 and/or other information generated by machine learning models). For example, the parameter generation model 1206 receives a representation of the user's request to generate code associated with deployment of a software application, as well as the code sample generated by an LLM in response to the user's request. Based on such information, the data generation platform 102 can generate validation test parameters that enable validation of the generated code sample (e.g., within an isolated environment corresponding to a virtual machine). The validation test parameters can include one or more of validation criteria 1208*a*, a virtual machine configuration 1208*b*, and/or compilation instructions 1208*c*.

The validation test parameters can include a virtual machine configuration. FIG. 13 shows a data structure 1300 depicting a virtual machine configuration (e.g., the virtual machine configuration 1208*b*), in accordance with some implementations of the present technology. The virtual machine configuration can include a characterization of an isolated testing environment for compiling, executing, and/or evaluating generated code samples. For example, the parameter generation model 1206 can generate a virtual machine configuration, including an indication of a hardware configuration 1310, a software configuration 1330, and/or a communication configuration 1350 for the testing environment (e.g., a virtual machine environment).

The hardware configuration 1310 can include a characterization of hardware components (e.g., as associated with a virtual machine and/or a run-time environment). For example, a hardware configuration includes an indication of a system architecture, such as a CPU architecture (e.g., x86 and/or ARM) or a GPU architecture (e.g., Single Instruction Single Data (SISD), Single Instruction Multiple Data (SIMD), Multiple Instruction Single Data (MISD), and/or other suitable architectures), an indication of a storage type (e.g., an SSD and/or an HDD), an indication of a storage space (e.g., a size associated with the storage in bytes), and/or an indication of a memory type and/or space (e.g., associated with run-time or random-access memory). In some implementations, the hardware configuration includes the specification of peripherals and/or other devices associated with a computing device. The parameter generation model can generate the hardware configuration depending on the LLM input 1202 and/or the LLM output 1204 (e.g., the user's prompt and/or the generated code sample) based on a determination of hardware requirements associated with execution of the associated application. For example, the parameter generation model 1206 can determine that the code sample includes a request to transmit information to a physical display and can generate the hardware configuration to include an indication of a suitable display peripheral. By generating an indication of a hardware configuration associated with a validation test, the data generation platform 102 enables the specification of properties of a simulated computing device for testing generated code, thereby improving the accuracy and sensitivity of code validation.

The software configuration 1330 can include a characterization of software components (e.g., applications, operating systems, and/or other such components) associated with a virtual machine and/or run-time environment. For example, as shown in FIG. 13, the software configuration 1330 includes an indication of an operating system and/or version, and definition of environment variables (e.g., including a characterization of a home directory path, a display identifier, and/or a system language/locale). In some implementations, the software configuration 1330 includes an indication of libraries to be linked to the compiled executable instructions and/or other dependencies, such as other applications. The parameter generation model can generate the software configuration depending on the LLM input 1202 and/or the LLM output 1204 (e.g., the user's prompt and/or the generated code sample) based on a determination of software requirements associated with execution of the associated application. For example, the parameter generation model 1206 can determine that the code sample includes an indication of a particular software library and can generate the software configuration to include the software library. By specifying a software configuration for the validation test, the data generation platform 102 enables testing of generated code samples in an environment that includes any associated requirements for execution of the associated software application.

The communication configuration 1350 can include a characterization of communication links. For example, the communication configuration 1350 includes information relating to communication interfaces, peripherals, associated protocols, port configurations, data transmission rates, and/or security settings. To illustrate, the communication configuration 1350, as shown in FIG. 13, can include information relating to a standard associated with communication interfaces (e.g., wired or wireless network interfaces and/or interfaces with peripheral devices, such as computer mice, keyboards, and/or displays). The communication configuration 1350 can include an indication of a wireless network type and/or associated security standards, such as encryption standards. Additionally or alternatively, the communication configuration 1350 includes an indication of ports available for transmission of data (e.g., including information relating to associated communication protocols, including Hypertext Transfer Protocol (HTTP), Transmission Control Protocol/Internet Protocol (TCP/IP), and/or File Transfer Protocol (FTP) information). For example, the parameter generation model 1206 can determine that the code sample includes a network request (e.g., to download information via HTTP), and can generate the communication configuration to include a mechanism for accessing the internet. By generating information relating to communication configurations associated with a testing environment for generated code samples, the data generation platform 102 can accurately simulate execution of the associated application.

The data generation platform 102, at the operation 1210 shown in FIG. 12, can generate a virtual machine environment that is consistent with the generated virtual machine configuration **1208*b***. A virtual machine environment can include a subsystem associated with an environment (e.g., a virtual environment) in which computer programs can run, such as a run-time environment. The virtual machine environment can reside on one or more devices (e.g., in a cloud architecture) and can include containerized and/or non-containerized applications. For example, the environment can specify, define, and/or characterize memory management, environment variables, mechanisms for passing parameters between procedures, interfaces with an operating system, and/or other suitable conditions for computer program execution. For example, the virtual machine environment includes a virtual machine (e.g., an emulation or virtualization of a computer system) based on a particular computer architecture (e.g., as defined by the generated software and/or hardware configurations and/or associated communication configuration).

In some implementations, the parameter generation model 1206 can generate validation test parameters can include compilation instructions (e.g., associated with the code sample). The compilation instructions **1208*c* can include information, commands, and/or other suitable data associated with code compilation. For example, compilation instructions 1208*c* include information relating to how to generate an executable program based on a given code sample. In some implementations, the compilation instructions include an indication of a scripting language (e.g., a computer programming language) associated with the code sample. By generating such information, the parameter generation model 1206 provides information to aid in generation of an executable program (e.g., an executable binary and/or instructions) based on human-readable code. For example, the data generation platform 102 can retrieve, from a database of compilers, a compilation routine (e.g., a compiler) associated with a particular scripting language. In some implementations, the compilation instructions 1208*c* can include an identifier and/or address associated with a compiler for the given code sample (e.g., as associated with the corresponding scripting language). Furthermore, the compilation instructions 1208*c* can include flags, markers, and/or other customizations relating to the associated virtual machine configuration (e.g., as described below). For example, the compilation instructions 1208*c* include indications of compiler flags consistent with the virtual machine configuration generated by the parameter generation model 1206**.

Additionally or alternatively, the compilation instructions **1208*c* includes an indication of a source code for the suitable application for which the user requests modification. For example, based on the prompt provided to the LLM by the user (e.g., LLM input 1202), the data generation platform 102 determines a target application and/or associated source code associated with the output generation request. Accordingly, the parameter generation model can generate an indication of how to modify the source code using the generated code sample, as well as instructions to compile the modified source code. As such, by generating compilation instructions, the data generation platform 102** enables flexible, modular modification and/or deployment of applications based on model-generated code samples.

Based on the compilation instructions and the code sample, the data generation platform 102 can generate an executable program within the configured virtual machine environment. For example, the executable program (e.g., the executable instructions 1212 for a software routine) includes a binary file and/or machine-readable instructions enabling execution of a given application or software routine. The data generation platform 102 can generate the executable program within the generated virtual machine environment (e.g., associated with a computing device). To illustrate, the data generation platform 102 can retrieve an address associated with a compilation routine (e.g., via a compiler database associated with the virtual machine environment). For example, the compiler database can include an index of compiler addresses associated with corresponding programming languages. The data generation platform 102 can provide the code sample and/or associated source code to a program associated with the compilation routine to generate the executable instructions (e.g., a binary file), thereby program execution at operation 1214 of FIG. 12. In some implementations, the data generation platform 102 can execute the program associated with code (e.g., a code sample or associated source code for an application) without compiling the code, as in the case of an interpreted scripting language. For example, the compilation instructions can indicate an interpreter address for execution of the code associated with the scripting language.

The data generation platform 102 can generate, obtain, and/or retrieve a test output 1216 associated with execution of the program, as shown in FIG. 12. FIG. 14A shows a schematic 1400 of a test output 1402 and an expected output 1404, in accordance with some implementations of the present technology.

For example, the test output 1402 includes an indication of actions, events, and/or other activity associated with a test (e.g., of a code sample). For example, a test output includes a log file describing events associated with execution of an executable program relating to the code sample, such as an indication of connection initiation, memory usage, CPU usage, data generated, data transmitted, and/or other such information (e.g., timestamps associated with such events). For example, a test output includes data generated by a calculation or algorithm, and can include retrieved information (e.g., from a database).

The parameter generation model 1206 can generate validation criteria 1208*a* that enables evaluation of the code using the test output 1216. Validation criteria 1208*a* can include criteria (e.g., rules, requirements, and/or parameters) associated with evaluation of a code sample and/or system behavior associated with execution of a software application. For example, validation criteria includes an indication of forbidden system behavior, security protocols, and/or policies (e.g., associated with the policy database and/or the sensitive token database 414). For example, the validation criteria includes anomaly criteria, privacy criteria, an indication of an expected output, and/or associated similarity metric criteria. The validation criteria can include threshold values (e.g., or ranges of values) associated with system metrics, such as maximum memory usage limits, CPU usage limits, and/or other criteria associated with desired system performance (e.g., including other performance metrics).

The expected output 1404 can include an indication of a predicted output based on expected and/or desired behavior. For example, the expected output can include behavior indicated within the LLM input 1202 (e.g., including functionalities requested by the user within the associated output generation request). To illustrate, the expected output can include an indication of a predicted output based on a desired system behavior associated with executing an application with the requested code sample. The expected output can include an indication of a desired connection initiation event, a predicted memory usage, a predicted transmission of data, and/or associated timestamps.

Anomaly criteria can include criteria associated with detection of anomalies. For example, the validation criteria 1208*a* can include a requirement that forbids detected anomalies (e.g., as related to communications). An anomaly can include an indication of unexpected system behavior (e.g., as described within the user's output generation request). For example, an anomaly can include an anomalous communication and/or initiation of a communication to an unexpected or unauthorized entity. An anomaly can include known vulnerabilities, attempts to access a network, attempts to access a file system (e.g., a particular or unauthorized file system), and/or detection of sub-standard coding practices. By monitoring the test output for anomalous behavior, the data generation platform 102 can mitigate unauthorized and/or undesirable behavior.

In some implementations, the validation criteria generated by the parameter generation model 1206 includes privacy criteria. A privacy criterion can include an indication that sensitive information transmission and/or handling is forbidden (e.g., within the test output). For example, the privacy criterion includes a flag and/or a marker that causes the data generation platform 102 to evaluate the test output to determine whether the test output includes a sensitive token (e.g., from a sensitive token database). For example, the validation criteria can specify that personal information associated with a particular user is forbidden within the test output. In some implementations, the data generation platform 102 can determine whether to forbid such sensitive information (e.g., whether to include a privacy criterion within the validation criteria) based on an indication of an application or use-case within the prompt/user input. For example, the data generation platform 102 can determine that the generated code sample is associated with communications with external parties that are unauthorized to receive sensitive information; based on this determination the data generation platform 102 can generate the validation criteria to include a privacy criterion.

At operation 1218 of FIG. 12, the data generation platform 102 can determine whether the test output 1216 satisfies the validation criteria 1208*a*. For example, the data generation platform 102 can generate a validation indicator. FIG. 14B shows a data structure 1410 depicting a validation indicator, in accordance with some implementations of the present technology. For example, a validation indicator includes a characterization of whether the test output satisfies one or more criteria of the validation criteria. For example, the validation indicator includes an indication of a validation error, including an indication that a particular criterion of the validation criteria is not satisfied. For example, the validation indicator includes an indication of whether anomalous connections are detected in the test output in response to the validation criteria including an anomaly criterion. The validation indicator can include an indication of whether sensitive information is included within the test output (e.g., in response to validation criteria including a privacy criterion).

In some implementations, the data generation platform 102 can compare the expected output associated with the validation criteria with the test output (e.g., the test output 1216). For example, the data generation platform 102 generates vector representations of the test output and/or the expected output, such as through a word2vec algorithm or another suitable natural language tokenization algorithm. The data generation platform 102 can determine a measure of similarity between the respective vector representations (e.g., a similarity metric value). For example, the data generation platform 102 can determine (e.g., in a range from 0 to 1) a metric indicating a similarity between the expected output and the test output. In some implementations, the validation criteria includes an indication that the similarity metric value must be greater than or equal to a threshold value corresponding to a threshold similarity metric value. To illustrate, the data generation platform 102 can determine that the test output satisfies the validation criteria based on comparing the similarity metric value with the threshold value. By doing so, the data generation platform 102 can ensure that the system behavior in response to executing a software routine associated with the generated code sample does not deviate from expected behavior by greater than a specified extent, thereby improving the stability of the system.

In some implementations, the data generation platform 102 can determine the threshold value corresponding to the similarity metric based on a risk level associated with the user (e.g., the user associated with the output generation request). For example, the data generation platform 102 determines or generates a greater threshold value for a user with less experience (e.g., based on a user identifier and/or a user database) than for a user with more experience. To illustrate, the data generation platform 102 can determine a first threshold value associated with a user designated as "high risk" (e.g., based on a number of years of coding experience being less than a threshold number), a second threshold value associated with a user designated as "medium risk" (e.g., based on a number of years of coding experience being between two threshold numbers), and/or a third threshold value associated with a user designated as "low risk" (e.g., based on a number of years of coding experience being above another threshold number). The system can determine the threshold values such that the first threshold value is greater than the second threshold value, which is greater than the third threshold value. By doing so, the data generation platform 102 can modify the extent to which the test output should match the expected output based on an experience level for the user. In some implementations, such threshold values can be based on user credential types, and/or other user-related information.

The data generation platform 102 can determine that the test output is validated (e.g., that all criteria of the validation criteria are satisfied). In response to such a determination, the data generation platform 102 can transmit the code sample for access by an associated user (e.g., at the operation 1220). Additionally or alternatively, the data generation platform 102 can determine that the test output is not validated (e.g., that one or more criteria of the validation criteria is not satisfied). Based on such a determination, the data generation platform 102 can transmit the validation indicator 1222 (e.g., including indications of associated validation errors) to an LLM (e.g., the first model) for modification and/or generation of a second code sample. For example, the data generation platform 102 can generate a second code sample using a generative model that cures determined validation errors (e.g., by including an indication of the appropriate validation errors within a prompt of the LLM). As such, the data generation platform 102 enables flexible, targeted validation of LLM outputs that include code and/or other software-related information in a bespoke, configurable, safe virtual environment.

Process for Validating Model Outputs in a Virtual Environment

Figure 15:
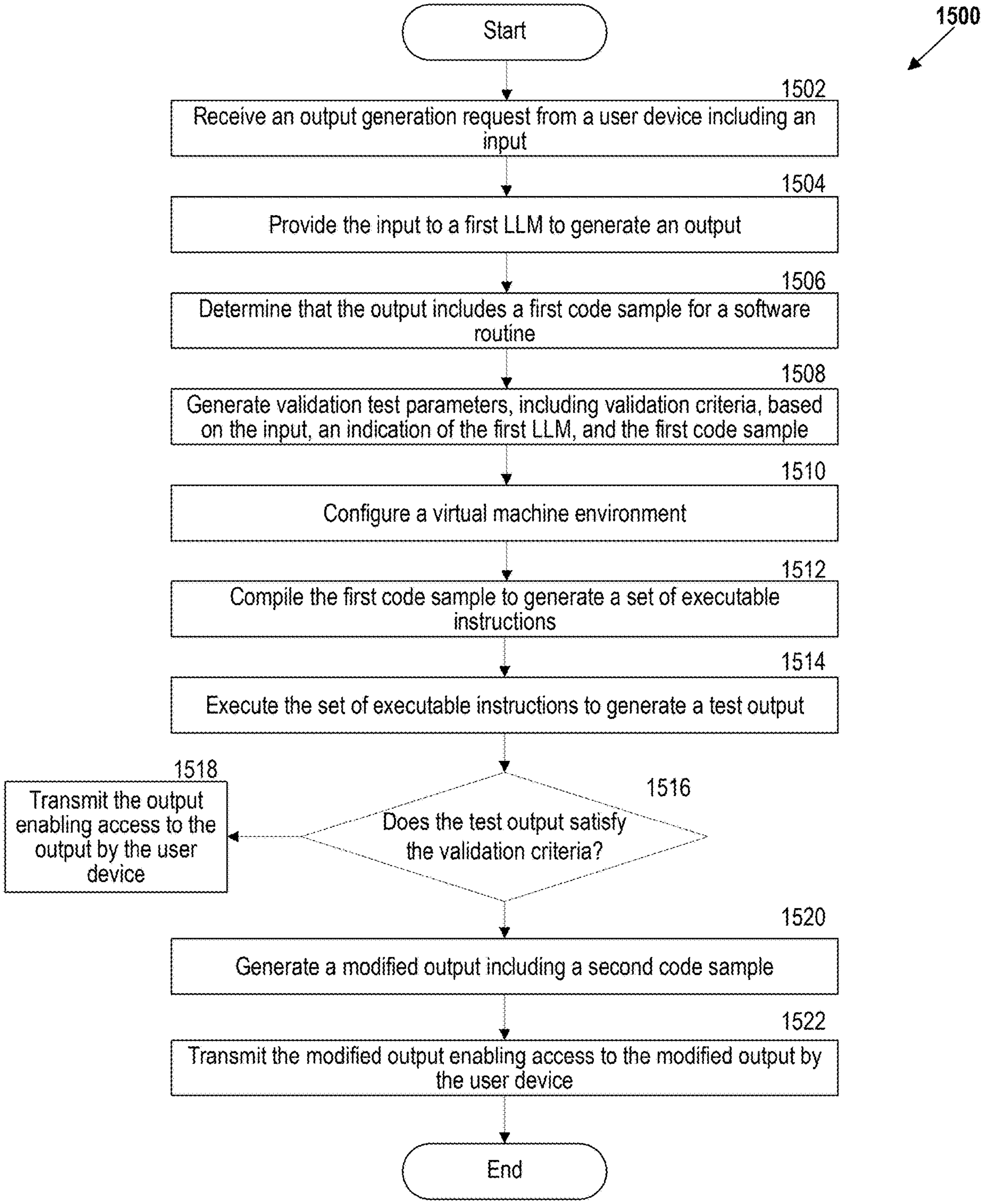
FIG. 15 shows a flow diagram illustrating a process for dynamic evaluation of machine model outputs in an isolated environment, in accordance with some implementations of the present technology.

FIG. 15 shows a flow diagram illustrating a process 1500 for dynamic evaluation of machine model outputs in an isolated environment, in accordance with some implementations of the present technology. For example, the process 1500 enables evaluation of software-related code samples (e.g., code snippets) generated by LLMs for security breaches, intended system behavior, or software bugs/errors based on input-dependent validation tests within an isolated environment.

At act 1502, process 1500 can receive an output generation request that includes an input (e.g., a prompt for generation of text-based output). For example, the data generation platform 102 receives, from a user device, an output generation request including an input for generation of an output using a first large-language model (LLM). As an illustrative example, the data generation platform 102 can receive a text-based prompt indicating generation of a code snippet with a specified functionality and in a particular programming language (e.g., including a function for performing a particular calculation). As such, the data generation platform 102 enables the generation of software-related information, including textual code, according to user specifications.

At act 1504, process 1500 can provide the output to the requested model for generation of an output (e.g., a text-based output). For example, the data generation platform 102 provides the input to the first model to generate the output. As an illustrative example, the data generation platform 102 can provide the user prompt to an LLM that is configured to generate software-related code samples (e.g., one or more portions of source code) in response to user inputs. In some implementations, the output includes portions that are software code and other portions that are descriptions, comments, or other non-code data. Thus, the data generation platform 102 can obtain a model output that includes output (e.g., including a code sample) in response to the output generation request.

At act 1506, process 1500 can determine that the output includes software-related data, such as code. For example, the data generation platform 102 determines that the output includes a first code sample for a software routine. As an illustrative example, the data generation platform 102 can identify one or more portions of output generated from an LLM that correspond to code or other software-related information. For example, the data generation platform 102 extracts data from the LLM that corresponds to code. By doing so, the data generation platform 102 can further evaluate, test, and/or validate the functioning, security, and privacy associated with the execution of the code, as described below.

At act 1508, process 1500 can generate validation test parameters that characterize a test for validating the generated code sample. For example, in response to determining that the output includes the first code sample, the data generation platform 102 provides the input, an indication of the first model, and the first code sample to a parameter generation model to generate validation test parameters. The validation test parameters can include compilation instructions, a virtual machine configuration, and validation criteria. As an illustrative example, the data generation platform 102 can generate test parameters that characterize the nature, strictness, and/or criteria associated with testing the generated code samples for security, privacy and/or errors. For example, the data generation platform 102 determines the nature of the isolated environment (e.g., the virtual machine) in which to generate or compile an executable program associated with the code sample, based on the nature of the code sample and/or the associated output generation request. Additionally or alternatively, the data generation platform 102 identifies a procedure for compiling the code sample (e.g., by updating associated source code and executing a compilation routine). As such, the data generation platform 102 can generate flexible output testing parameters in a prompt-specific and/or application-specific manner.

At act 1510, process 1500 can configure a virtual machine environment according to the generated virtual machine configuration. For example, the data generation platform 102 configures, based on the virtual machine configuration, a virtual machine environment. As an illustrative example, the data generation platform 102 can identify and/or generate a virtual machine with an environment that includes parameters and/or properties as defined within the virtual machine configuration. For example, the data generation platform 102 can generate the virtual machine to simulate any network connections, hardware configurations, or software features as specified within the validation test parameters. By doing so, the data generation platform 102 can prepare an environment (e.g., an isolated environment) in which to test generated code in a safe, flexible manner.

In some implementations, the data generation platform 102 configures the virtual machine environment according to a communication configuration. For example, the data generation platform 102 determines that the virtual machine configuration includes an indication of a communication configuration indicating one or more communication interfaces. The data generation platform 102 can generate the virtual machine environment including a simulation of the one or more communication interfaces. As an illustrative example, the data generation platform 102 configures the virtual machine environment to include simulations of connections, such as WAN, LAN, and/or peripheral connections. By doing so, the data generation platform 102 can test any attempted transmissions associated with the generated code, thereby enabling the mitigation of security breaches or the unintended exposure of private information.

In some implementations, the data generation platform 102 configures the virtual machine environment according to a hardware configuration. For example, the data generation platform 102 determines that the virtual machine configuration includes an indication of a hardware configuration indicating a system architecture. The data generation platform 102 can generate the virtual machine environment including a simulation of the system architecture. As an illustrative example, the data generation platform 102 can simulate a hardware architecture (e.g., including emulation of central processing units (CPUs), graphics processing units (GPUs), and/or other associated hardware devices) within the virtual machine environment, thereby enabling comprehensive testing of system behavior due to the execution of generated code.

At act 1512, process 1500 can compile the first code sample to generate executable instructions for further testing. For example, the data generation platform 102 compiles, within the virtual machine environment and using the compilation instructions, the first code sample to generate a set of executable instructions for the software routine. As an illustrative example, the data generation platform 102 generate an executable version of a software routine associated with the code sample (e.g., an executable binary file) using the compilation instructions associated with the generated validation test parameters. For example, the data generation platform 102, using the compilation instructions, configures the executable binary file to be compatible with the simulated hardware architecture and/or software consistent with the virtual machine configuration. By doing so, the data generation platform 102 can prepare the generated code to be tested within the isolated environment (e.g., the virtual machine).

In some implementations, the data generation platform 102 configures a compilation routine based on identification of an associated scripting language. For example, the data generation platform 102 determines that the compilation instructions include an identifier of a scripting language. The data generation platform 102 can determine, from a compiler database, a compilation routine associated with the scripting language. The data generation platform 102 can configure, based on the virtual machine configuration, the compilation routine for operability within the virtual machine environment. The data generation platform 102 can generate, within the virtual machine environment and using the configured compilation routine, the set of executable instructions for the software routine. As an illustrative example, the data generation platform 102 can identify a programming language associated with the generated code and search for or identify an associated compiler. For example, the data generation platform 102 extracts an address associated with the compiler within a compiler database to determine a compiler (e.g., or an associated compilation routine) that is compatible with the compilation instructions, thereby enabling compilation of the code sample and generation of the associated executable instructions.

At act 1514, process 1500 can execute the executable instructions to generate a test output. For example, the data generation platform 102 executes, within the virtual machine environment, the set of executable instructions for the software routine to generate a test output. As an illustrative example, the data generation platform 102 can run, execute, or process the compiled instructions. In some implementations, the data generation platform 102, via the virtual machine configuration, can log (e.g., monitor) actions or effects of the running software routine. For example, the data generation platform 102 can detect communications associated with the simulated communication interfaces of the virtual machine, and/or determine run-times associated with the program. As such, the data generation platform 102 enables evaluation of the system behavior in relation to the code sample generated by the model in response to the output generation request.

At act 1516, process 1500 can determine whether the test output satisfies the validation criteria. For example, the data generation platform 102 determines a validation indicator specifying whether the test output satisfies the validation criteria. As an illustrative example, the data generation platform 102 can extract one or more criteria associated with the generated validation criteria of the validation test parameters. For example, the data generation platform 102 can extract a criterion specifying that memory usage is to remain within a particular range of values. The data generation platform 102 can monitor the test output (e.g., including readings of memory usage over time) to determine whether the criterion is satisfied throughout the execution of the executable program instructions. By doing so, the data generation platform 102 enables validation of the code generated via the associated models by evaluating the associated system behavior.

In some implementations, the data generation platform 102 validates communications associated with the virtual machine environment for anomalies. For example, the data generation platform 102 determines that the validation criteria includes an anomaly criterion indicating that an anomalous communication is forbidden. The data generation platform 102 can evaluate the test output including communications associated with the one or more communication interfaces. Based on determining that the communications include the anomalous communication, the data generation platform 102 can determine that the test output does not satisfy the validation criteria. The data generation platform 102 can generate the validation indicator including an indication that the test output does not satisfy the validation criteria. As an illustrative example, the data generation platform 102 can determine an attempt to initiate an unexpected connection (e.g., a WAN connection when only a LAN connection is allowed, according to validation criteria). By doing so, the data generation platform 102 can ensure that, following software deployment, sensitive information is not shared with unauthorized devices (e.g., beyond a particular LAN), thereby improving system security.

In some implementations, the data generation platform 102 determines a measure of similarity between the test output and an expected output to determine whether the test output satisfies the validation criteria. For example, the data generation platform 102 determines, based on the validation criteria, an expected test output for the software routine. The data generation platform 102 can generate a first vector representation for the expected test output and a second vector representation for the test output. The data generation platform 102 can generate a similarity metric value including a measure of a similarity metric between the first vector representation and the second vector representation. The data generation platform 102 can determine, based on the output generation request, a threshold value associated with the similarity metric. The data generation platform 102 can comparing the similarity metric value with the threshold value. Based on determining that the similarity metric value satisfies the threshold value, the data generation platform 102 can determine that the test output satisfies the validation criteria. The data generation platform 102 can generate the validation indicator specifying that the test output satisfies the validation criteria. As an illustrative example, the data generation platform 102 can determine an expected output (e.g., an expected log file) based on the validation criteria and/or other associated validation test parameters). To illustrate, the expected output can describe expected or predicted actions taken in response to executing the compiled code sample, such as memory usage, connections, and/or generation of other requested outputs (e.g., data generated by the executable instructions). The data generation platform 102 can compare the expected output with the actual test output to determine a similarity metric value (e.g., by comparing vector representations of the respective outputs). Based on determining the similarity metric value, the data generation platform 102 can determine if the test output differs from the expected output by a threshold value and, as such, can flag or detect unexpected behavior. As such, the data generation platform 102 enables improved anomalous behavior detection for an associated system.

In some implementations, the data generation platform 102 can determine the threshold value based on a user risk level associated with the output generation request. For example, the data generation platform 102 determines a user identifier associated with the output generation request. The data generation platform 102 can determine, based on a user database, a risk level for a user associated with the user identifier. The risk level can indicate a low, medium, or high risk associated with user activity for the user. In response to determining that the risk level indicates the medium or high risk associated with the user activity, the data generation platform 102 can determine a first value for the threshold value. In response to determining that the risk level indicates the low risk associated with the user activity, the data generation platform 102 can determine a second value for the threshold value, wherein the second value is greater than the first value. As an illustrative example, the data generation platform 102 can determine a strictness associated with evaluating the differences between an expected output and the test output on the basis of user credentials and/or a risk level associated with the user associated with the output generation request. For example, a user with less coding experience (e.g., with a number of years of experience fewer than a threshold number) can be assigned a high or medium risk level. Additionally or alternatively, a user with more coding experience (e.g., with a number of years of experience greater than the threshold number) can be assigned a low risk level. By tuning the threshold value associated with the similarity metric according to user credentials and/or user risk, the data generation platform 102 can improve mitigation of security breaches, errors, or bugs in a user-specific, targeted manner, thereby improving the efficiency of output evaluation by focusing system resources on users most likely to commit errors in software development.

In some implementations, the data generation platform 102 can determine whether the test output includes sensitive information (e.g., from the sensitive token database). For example, the data generation platform 102 determines that the validation criteria includes a privacy criterion indicating that sensitive information is forbidden in the test output. Based on determining that the validation criteria includes the privacy criterion, the data generation platform 102 can determine whether the test output includes a sensitive token of a sensitive token database. The data generation platform 102 can generate the validation indicator including an indication of whether the test output includes the sensitive token of the sensitive token database. As an illustrative example, the data generation platform 102 can determine that the test output includes sensitive and/or private information, such as PII, secrets, or other such information, based on determining that a token (e.g., a word, phrase, or sentence) of the test output is included within a sensitive token database. By doing so, the data generation platform 102 can prevent disclosure and/or exposure of sensitive or private information, thereby improving the safety of the system to which the code is to be deployed.

At act 1518, process 1500 can transmit the output from the first model in order to provide access to the output (e.g., the generated code sample) for the user. For example, in response to determining that the test output satisfies the validation criteria, the data generation platform 102 transmits the output to a server system enabling access to the output by the user device. As an illustrative example, the data generation platform 102 can determine that the test output satisfies validation criteria generated by the parameter generation model. For example, the data generation platform 102 determines that the test output indicates that the virtual machine remained within memory usage requirements specified by the validation criteria and did not attempt to communicate with forbidden devices (e.g., through forbidden communication channels). By doing so, the data generation platform 102 can ensure the security of the system prior to providing the generated code sample to the user requesting the code sample, in response to the output generation request.

At act 1520, process 1500 can generate a modified output when the test output does not satisfy the validation criteria. For example, in response to determining that the test output does not satisfy the validation criteria, the data generation platform 102 generates a modified output including a second code sample different from the first code sample. As an illustrative example, the data generation platform 102 can determine that the virtual machine, when executing the executable instructions associated with the code sample, does not satisfy memory usage requirements and/or attempts to communicate via forbidden channels. By doing so, the data generation platform 102 can modify the code to resolve any detected deficiencies in the validation test (e.g., based on an indication of a validation error). By doing so, the data generation platform 102 can resolve any bugs, errors, and/or security issues associated with the code sample generated in response to the output generation request.

In some implementations, the data generation platform 102 can generate the modified output by providing an indication of a validation error (e.g., associated with the validation indicator) to an LLM. For example, the data generation platform 102 determines, based on the validation indicator, an indication of a validation error associated with the test output. The indication of the validation error can include an indication of a criterion of the validation criteria that is not satisfied by the test output. The data generation platform 102 can provide the indication of the validation error, the first code sample, and the input to the first LLM to generate the modified output including the second code sample. As an illustrative example, the data generation platform 102 can generate a summary of any deficiencies associated with the validation test failure (e.g., an indication of particular criteria that was not satisfied by the test output) and provide such information to the LLM, along with the first code sample, to modify the code sample to resolve issues causing the validation test failure. For example, the data generation platform 102 modifies the code sample to prevent communication via a forbidden communication channel and/or to a forbidden communication device. By doing so, the data generation platform 102 can fix generated code in a targeted manner, improving the efficiency of software development.

At act 1522, process 1500 can transmit the modified output in order to provide access to the modified output for the user. For example, the data generation platform 102 transmits the modified output to the server system to enable access to the modified output by the user device. As an illustrative example, the data generation platform 102 can provide the modified output (e.g., including a modified code sample) to the user in response to the output generation request. As such, the data generation platform 102 can provide generated code to a user following validation and resolution of any validation test discrepancies, thereby improving the quality and security of the generated code for use by the user.

In some implementations, the data generation platform 102 can transmit the modified output to the user device in response to validating the modified output. For example, the data generation platform 102 compiles, within the virtual machine environment and using the compilation instructions, the second code sample to generate a second set of executable instructions. The data generation platform 102 can execute, within the virtual machine environment, the second set of executable instructions to generate a second test output. The data generation platform 102 can determine whether the second test output satisfies the validation criteria. In response to determining that the second test output satisfies the validation criteria, the data generation platform 102 can transmit the modified output to the server system to enable access to the modified output by the user device. As an illustrative example, the data generation platform 102 can ensure that the modified output (and/or the associated code) is consistent with the validation criteria prior to transmission to the user, thereby preventing any additional errors or security breaches introduced as a result of the modification.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A non-transitory computer-readable storage medium comprising instructions thereon, wherein the instructions when executed by at least one data processor of a system, cause the system to:

determine a performance metric associated with processing an output generation request comprising a prompt for generation of an output using a first large-language model (LLM) of a plurality of LLMs;

determine a system state associated with available system resources for processing requests using the first LLM of the plurality of LLMs, wherein the system state includes information relating to at least one of computational resource usage, memory usage, hard disk space usage, or cost incurred;

compare a first estimated performance metric value for the determined performance metric with a threshold metric value associated with the determined performance metric, wherein the threshold metric value is based on the system state and indicates an allotment of the available system resources for processing the output generation request;

in response to determining that the first estimated performance metric value satisfies the threshold metric value:

provide the prompt to the first LLM to generate a first output by processing the prompt included in the output generation request; and enable access to the first output;

based on determining that the first estimated performance metric value does not satisfy the threshold metric value:

provide the prompt to a second LLM of the plurality of LLMs to generate a second output by processing the prompt included in the output generation request; and enable access to the second output.

2. The non-transitory computer-readable storage medium of claim 1, wherein the instructions further cause the system to:

determine that the performance metric corresponds to a cost metric;

determine a maximum cost value associated with output generation associated with the system;

determine, based on the system state, a sum of cost metric values for previous output generation requests associated with the system;

determine, based on the maximum cost value and the sum, an allowance value corresponding to the threshold metric value; and determine the threshold metric value comprising the allowance value.

3. The non-transitory computer-readable storage medium of claim 2, wherein the instructions for determining the allowance value cause the system to:

determine, based on the output generation request, a user identifier associated with a user;

determine, using the user identifier, a first group of users, wherein the first group comprises the user; and determine the allowance value associated with the first group of users.

4. The non-transitory computer-readable storage medium of claim 1, wherein the first estimated performance metric value corresponds to a number of input or output tokens, and wherein the threshold metric value corresponds to a maximum number of tokens.

5. The non-transitory computer-readable storage medium of claim 1, wherein the instructions further cause the system to provide the prompt and an indication of the first LLM to a performance metric evaluation model to generate the first estimated performance metric value.

6. The non-transitory computer-readable storage medium of claim 5, wherein the instructions further cause the system to:

obtain, from a first database, a plurality of training prompts and respective performance metric values associated with providing respective training prompts to the first LLM; and providing the plurality of training prompts and respective performance metric values to the performance metric evaluation model to train the performance metric evaluation model to generate estimated performance metric values based on prompts.

7. The non-transitory computer-readable storage medium of claim 1, wherein the instructions further cause the system to:

determine that the performance metric corresponds to a usage metric for a computational resource;

determine an estimated usage value for the computational resource based on an indication of an estimated computational resource usage by the first LLM when processing the prompt with the first LLM;

determine a maximum usage value for the computational resource;

determine, based on the system state, a current resource usage value for the computational resource;

determine, based on the maximum usage value and the current resource usage value, an allowance value corresponding to the threshold metric value; and determine the threshold metric value comprising the allowance value.

8. The non-transitory computer-readable storage medium of claim 1, wherein the instructions for providing the prompt to the second LLM cause the system to:

in response to determining that the first estimated performance metric value does not satisfy the threshold metric value, transmit an LLM selection request to a user device;

in response to transmitting the LLM selection request, obtain, from the user device, a selection of the second LLM; and provide the prompt to the second LLM associated with the selection.

9. The non-transitory computer-readable storage medium of claim 1, wherein the instructions further cause the system to:

determine that the performance metric comprises a composite metric associated with a plurality of system metrics;

determine, based on the system state, a threshold composite metric value;

determine a plurality of estimated metric values corresponding to the plurality of system metrics, wherein each estimated metric value of the plurality of estimated metric values indicates a respective estimated resource usage associated with processing the output generation request with the first LLM;

determine, using the plurality of estimated metric values, a composite metric value associated with processing the output generation request with the first LLM; and determine the first estimated performance metric value comprising the composite metric value.

10. The non-transitory computer-readable storage medium of claim 1, wherein the instructions for providing the prompt to the second LLM cause the system to:

provide the output generation request and an indication of the plurality of LLMs to a selection model configured to generate recommendations for model selection based on user prompts;

in response to providing the output generation request to the selection model, generate a recommendation to process the output generation request using the second LLM of the plurality of LLMs; and in response to generating the recommendation, provide the prompt to the second LLM to generate a third output.

11. The non-transitory computer-readable storage medium of claim 1, wherein the instructions for providing the prompt to the second LLM cause the system to:

in response to determining that the first estimated performance metric value does not satisfy the threshold metric value, generate, for display on a user interface of a user device, a request for user instructions, wherein the request for user instructions comprises a recommendation for processing the output generation request with the second LLM of the plurality of LLMs;

in response to generating the request for user instructions, receive a user instruction comprising an indication of the second LLM; and in response to receiving the user instruction, provide the prompt to the second LLM.

12. A system comprising:

at least one hardware processor; and at least one non-transitory memory storing instructions, which, when executed by the at least one hardware processor, cause the system to:

determine a performance metric associated with processing an output generation request comprising a prompt for generation of an output using a first LLM of a plurality of LLMs;

determine a system state associated with available system resources for processing requests using the first LLM of the plurality of LLMs, wherein the system state includes information relating to at least one of computational resource usage, memory usage, hard disk space usage, or cost incurred;

compare a first estimated performance metric value for the determined performance metric with a threshold metric value associated with the determined performance metric, wherein the threshold metric value is based on the system state and indicates an allotment of the available system resources for processing the output generation request;

in response to determining that the first estimated performance metric value satisfies the threshold metric value:

provide the prompt to the first LLM to generate a first output by processing the prompt included in the output generation request; and enable access to the first output;

based on determining that the first estimated performance metric value does not satisfy the threshold metric value:

provide the prompt to a second LLM of the plurality of LLMs to generate a second output by processing the prompt included in the output generation request; and enable access to the second output.

13. The system of claim 12, wherein the instructions further cause the system to:

determine that the performance metric corresponds to a cost metric;

determine a maximum cost value associated with output generation associated with the system;

determine, based on the system state, a sum of cost metric values for previous output generation requests associated with the system;

determine, based on the maximum cost value and the sum, an allowance value corresponding to the threshold metric value; and determine the threshold metric value comprising the allowance value.

14. The system of claim 13, wherein the instructions for determining the allowance value cause the system to:

determine, based on the output generation request, a user identifier associated with a user;

determine, using the user identifier, a first group of users, wherein the first group comprises the user; and determine the allowance value associated with the first group of users.

15. The system of claim 12, wherein the first estimated performance metric value corresponds to a number of input or output tokens, and wherein the threshold metric value corresponds to a maximum number of tokens.

16. The system of claim 12, wherein the instructions further cause the system to:

determine that the performance metric corresponds to a usage metric for a computational resource;

determine an estimated usage value for the computational resource based on an indication of an estimated computational resource usage by the first LLM when processing the prompt with the first LLM;

determine a maximum usage value for the computational resource;

determine, based on the system state, a current resource usage value for the computational resource;

determine, based on the maximum usage value and the current resource usage value, an allowance value corresponding to the threshold metric value; and determine the threshold metric value comprising the allowance value.

17. A method comprising:

determining a performance metric associated with processing an output generation request comprising an input for generation of an output using a first model of a plurality of models;

determining a system state associated with available system resources for processing requests using the first model of the plurality of models, wherein the system state includes information relating to at least one of computational resource usage, memory usage, hard disk space usage, or cost incurred;

comparing a first estimated performance metric value for the determined performance metric with a threshold metric value associated with the determined performance metric, wherein the threshold metric value is based on the system state and indicates an allotment of the available system resources for processing the output generation request;

in response to determining that the first estimated performance metric value satisfies the threshold metric value:

providing the input to the first model to generate a first output by processing the input included in the output generation request; and enabling access to the first output;

based on determining that the first estimated performance metric value does not satisfy the threshold metric value:

providing the input to a second model of the plurality of models to generate a second output by processing the input included in the output generation request; and enabling access to the second output.

18. The method of claim 17, comprising:

determining that the performance metric corresponds to a cost metric;

determining a maximum cost value associated with output generation;

calculating, based on the system state, a sum of cost metric values for previous output generation requests;

determining, based on the maximum cost value and the sum, an allowance value corresponding to the threshold metric value; and determining the threshold metric value comprising the allowance value.

19. The method of claim 18, wherein determining the allowance value comprises:

determining, based on the output generation request, a user identifier associated with a user;

determining, using the user identifier, a first group of users, wherein the first group comprises the user; and determining the allowance value associated with the first group of users.

20. The method of claim 17, wherein the first estimated performance metric value corresponds to a number of input or output tokens, and wherein the threshold metric value corresponds to a maximum number of tokens.

* * * * *